March 10, 1970  F. W. SCHAAF  3,499,516

TAPELESS CARRIAGE CONTROL

Filed Aug. 21, 1967  25 Sheets-Sheet 1

INVENTOR.
FREDERICK W. SCHAAF

BY Francis V. Giolma
ATTORNEY

| FIG.2a | FIG.2b | FIG.2c | FIG.2d | FIG.2e | FIG.2f | FIG.2g | FIG.2h | FIG.2i | FIG.2j |
|---|---|---|---|---|---|---|---|---|---|
| FIG.2k | FIG.2l | FIG.2m | FIG.2n | FIG.2o | FIG.2p | FIG.2q | FIG.2r | FIG.2s | FIG.2t |

VALID CARRIAGE CONTROL BUFFER CODES
THE FOLLOWING CODES CONTAIN THE FLAG BIT FOR DEFINING
THE LAST LINE OF THE FORM

```
CODE            BUS OUT BITS
                P 0 1 2 3 4 5 6 7
SPACE           0 0 0 0 1 0 0 0 0
CHANNEL 1       1 0 0 0 1 0 0 0 1
CHANNEL 2       1 0 0 0 1 0 0 1 0
CHANNEL 3       0 0 0 0 1 0 0 1 1
CHANNEL 4       1 0 0 0 1 0 1 0 0
CHANNEL 5       0 0 0 0 1 0 1 0 1
CHANNEL 6       0 0 0 0 1 0 1 1 0
CHANNEL 7       1 0 0 0 1 0 1 1 1
CHANNEL 8       1 0 0 0 1 1 0 0 0
CHANNEL 9       0 0 0 0 1 1 0 0 1
CHANNEL 10      0 0 0 0 1 1 0 1 0
CHANNEL 11      1 0 0 0 1 1 0 1 1
CHANNEL 12      0 0 0 0 1 1 1 0 0
  NOTE: BIT 3 IS THE LAST LINE FLAG BIT
```

FIG. 4

THE FOLLOWING CODES ARE USED TO
DEFINE LINE POSITIONS OTHER THAN
THE LAST LINE OF THE FORM

```
CODE            BUS OUT BITS
                P 0 1 2 3 4 5 6 7
SPACE           1 0 0 0 0 0 0 0 0
CHANNEL 1       0 0 0 0 0 0 0 0 1
CHANNEL 2       0 0 0 0 0 0 0 1 0
CHANNEL 3       1 0 0 0 0 0 0 1 1
CHANNEL 4       0 0 0 0 0 0 1 0 0
CHANNEL 5       1 0 0 0 0 0 1 0 1
CHANNEL 6       1 0 0 0 0 0 1 1 0
CHANNEL 7       0 0 0 0 0 0 1 1 1
CHANNEL 8       0 0 0 0 0 1 0 0 0
CHANNEL 9       1 0 0 0 0 1 0 0 1
CHANNEL 10      1 0 0 0 0 1 0 1 0
CHANNEL 11      0 0 0 0 0 1 0 1 1
CHANNEL 12      1 0 0 0 0 1 1 0 0
```

FIG. 5

| COMMAND | BUS OUT BITS |
|---|---|
| | P 0 1 2 3 4 5 6 7 |
| TEST I/O | 1 0 0 0 0 0 0 0 0 |
| SENSE | 0 0 0 0 0 0 1 0 0 |
| WRITE WITHOUT SPACING | 0 0 0 0 0 0 0 0 1 |
| WRITE AND SPACE 1 | 1 0 0 0 0 1 0 0 1 |
| WRITE AND SPACE 2 | 1 0 0 0 1 0 0 0 1 |
| WRITE AND SPACE 3 | 0 0 0 0 1 1 0 0 1 |
| WRITE AND SKIP TO CHAN 1 | 0 1 0 0 0 1 0 0 1 |
| WRITE AND SKIP TO CHAN 2 | 0 1 0 0 1 0 0 0 1 |
| WRITE AND SKIP TO CHAN 3 | 1 1 0 0 1 1 0 0 1 |
| WRITE AND SKIP TO CHAN 4 | 0 1 0 1 0 0 0 0 1 |
| WRITE AND SKIP TO CHAN 5 | 1 1 0 1 0 1 0 0 1 |
| WRITE AND SKIP TO CHAN 6 | 1 1 0 1 1 0 0 0 1 |
| WRITE AND SKIP TO CHAN 7 | 0 1 0 1 1 1 0 0 1 |
| WRITE AND SKIP TO CHAN 8 | 0 1 1 0 0 0 0 0 1 |
| WRITE AND SKIP TO CHAN 9 | 1 1 1 0 0 1 0 0 1 |
| WRITE AND SKIP TO CHAN 10 | 1 1 1 0 1 0 0 0 1 |
| WRITE AND SKIP TO CHAN 11 | 0 1 1 0 1 1 0 0 1 |
| WRITE AND SKIP TO CHAN 12 | 1 1 1 1 0 0 0 0 1 |

| COMMAND | BUS OUT BITS |
|---|---|
| | P 0 1 2 3 4 5 6 7 |
| NO OP | 1 0 0 0 0 0 0 1 1 |
| SPACE 1 IMMEDIATE | 0 0 0 0 0 1 0 1 1 |
| SPACE 2 IMMEDIATE | 0 0 0 0 1 0 0 1 1 |
| SPACE 3 IMMEDIATE | 1 0 0 0 1 1 0 1 1 |
| SKIP IMMEDIATE TO CHAN 1 | 1 1 0 0 0 1 0 1 1 |
| SKIP IMMEDIATE TO CHAN 2 | 1 1 0 0 1 0 0 1 1 |
| SKIP IMMEDIATE TO CHAN 3 | 0 1 0 0 1 1 0 1 1 |
| SKIP IMMEDIATE TO CHAN 4 | 1 1 0 1 0 0 0 1 1 |
| SKIP IMMEDIATE TO CHAN 5 | 0 1 0 1 0 1 0 1 1 |
| SKIP IMMEDIATE TO CHAN 6 | 0 1 0 1 1 0 0 1 1 |
| SKIP IMMEDIATE TO CHAN 7 | 1 1 0 1 1 1 0 1 1 |
| SKIP IMMEDIATE TO CHAN 8 | 1 1 1 0 0 0 0 1 1 |
| SKIP IMMEDIATE TO CHAN 9 | 0 1 1 0 0 1 0 1 1 |
| SKIP IMMEDIATE TO CHAN 10 | 0 1 1 0 1 0 0 1 1 |
| SKIP IMMEDIATE TO CHAN 11 | 1 1 1 0 1 1 0 1 1 |
| SKIP IMMEDIATE TO CHAN 12 | 0 1 1 1 0 0 0 1 1 |

United States Patent Office 3,499,516
Patented Mar. 10, 1970

3,499,516
TAPELESS CARRIAGE CONTROL
Frederick W. Schaaf, Owego, N.Y., assignor to International Business Machines Corporation, Armonk, N.Y., a corporation of New York
Filed Aug. 21, 1967, Ser. No. 661,929
Int. Cl. B41j 15/00
U.S. Cl. 197—133                    7 Claims

ABSTRACT OF THE DISCLOSURE

A carriage control system provides skip control of a printer carriage by means of coded representations of channel skip commands which are stored at different line positions in a carriage control buffer and are compared with commands from the printer controls to determine if they are identical, upon which a compare signal is produced. A line counter is driven by a clock which controls the address of the carriage control buffer and is selectively activated by a control Start signal and emitter pulses responsive to movement of a motor driving the carriage. The counter is complemented when a Compare signal is produced, and when a predetermined count is attained in response to carriage emitter pulses, a Stop signal is generated to stop the carriage in a desired position.

FIELD OF THE INVENTION

The invention relates generally to printer carriage controls and it has reference in particular to a tapeless carriage control for a multi-speed printer carriage.

DESCRIPTION OF PRIOR ART

Heretofore control of printer carriages has been effected by means of a punched paper tape which runs in step with the document and has holes punched in a plurality of channels at different line positions for effecting skip control, as exemplified by Patent No. 2,531,885, entitled "Paper Feeding Device," and which issued on Nov. 28, 1950 to A. W. Mills et al.

SUMMARY OF THE INVENTION

Generally stated, it is an object of this invention to provide a new and novel tapeless carriage control for a plural speed printer carriage.

Another object of the invention is to provide in a tapeless carriage control system for minimizing inadvertent modification of the contents of a carriage control storage device by requiring the carriage control storage device load command to follow a specific channel tag line sequence which is sensed and stored.

More specifically, it is an object of this invention to provide a tapeless carriage control buffer for storing at particular locations images of carriage skip channel commands, and for addressing the buffer in response to pulses from a clock which operates under the control of a line counter.

Another object of the invention is to provide in a tapeless carriage control system for using a line counter to determine the stopping point of the carriage.

Yet another object of the invention is to provide for so controlling the operation of a line counter in a printer carriage control that after a predetermined count without a compare occurring between a carriage skip command and a stored skip command, the carriage is accelerated to high speed operation.

It is also an object of this invention to provide for presetting a line counter in a tapeless carriage control system for single, double, and triple space commands, and complementing the line counter when a compare results for a skip operation, so that a common line count can be used to stop the carriage in a desired position.

Another important object of this invention is to provide for inhibiting advance of a line counter in a carriage control system when a predetermined count is reached without the occurrence of a compare signal, complementing the count when a compare is attained and utilizing a predetermined line count for stopping the carriage.

Still another important object of the invention is to provide for using a line counter actuated by clock pulses and controlled by emitter pulses from a printer carriage drive motor for controlling the transfer of a multi-speed carriage drive from one speed to another.

To control the operation of a multi-speed carriage drive for advancing a document on which a printing operation is to be performed, a carriage control buffer magnetic core storage device is used, having a plurality of positions corresponding to the print lines on the document and in which are stored binary coded representations of a number of channels containing skip command signals. The control buffer is loaded by program control commands from a data input channel under the control of system tag lines.

An address register provides for sequentially addressing the buffer one position each clock cycle during loading and during operation of the printer in response to pulses from a clock which is started in response to a command, and interrogates (or reads) one address during each clock cycle reading the stored channel image into a carriage control buffer register for comparison with a program command channel signal. A single shot provides a timed pulse for an initial operating pulse, while an emitter on the carriage drive motor provides the succeeding pulses.

A compare between the program command channel and a stored channel signal inhibits further advance of the address register and complements a line counter. The emitter pulses from the carriage drive motor activate the clock and advance the line counter. When a count of 15 is reached, a stop pulse is generated which is effective to produce timed stop pulses to stop the carriage in the desired position.

The foregoing and other objects, features, and advantages of the invention will be apparent from the following more particular description of a preferred embodiment of the invention as illustrated in the accompanying drawing.

DESCRIPTION OF THE DRAWING

In the drawing:
FIG. 4 is a chart showing typical carriage control codes;
FIG. 5 is a chart showing typical codes to define line positions other than the last line of a form;
FIGS. 6a through 6b are charts showing valid commands for control of a printer carriage utilizing the invention.

DESCRIPTION OF PREFERRED EMBODIMENT

Figure 1:
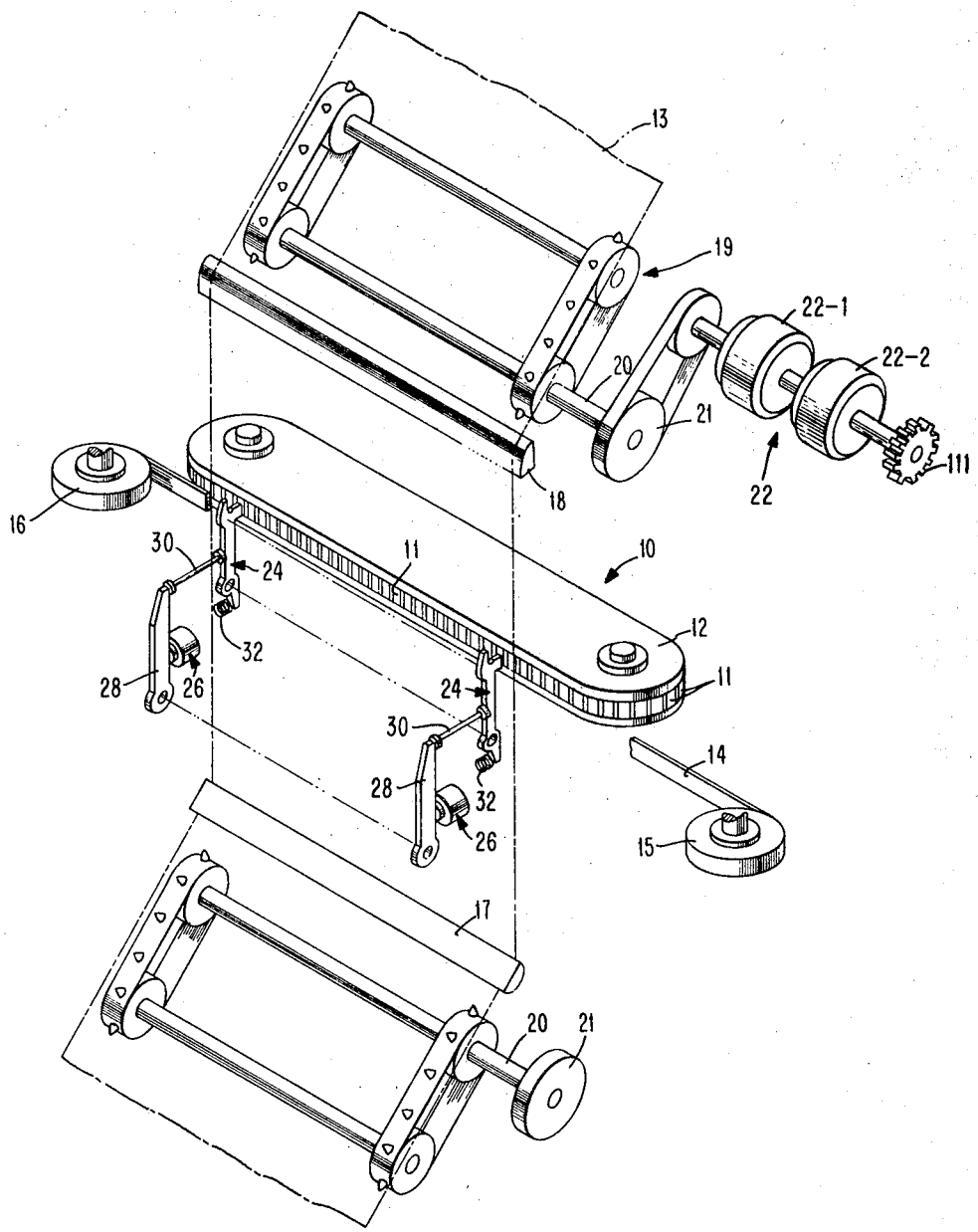
FIG. 1 is a partial schematic showing of one type of printer apparatus with which the invention may be used.

FIG. 1 shows a printer apparatus of one type with which the present invention may be used, and comprises a type carrier 10 having a plurality of individual type elements 11 movable in a continuous path on a stationary frame 12. A portion of the path of motion of the type elements 11 includes a straight portion along which printing can occur and which hereinafter is referred to as the print line. Each type element 11 has one or more different engraved characters on the surface thereof adjacent the print line. Plural sequences of type characters are obtained by assembling the type elements 11 in predetermined arrangements on the frame 12. The type elements 11 are driven preferably in the form of a train along the frame 12 so that they travel at a constant velocity and are maintained in abutting relation along the straight portion of the path of travel.

The printer apparatus of FIG. 1 is a back printer which is described in U.S. Patent No. 3,241,480, which issued on Mar. 22, 1966 to James M. Cunningham, and in accordance with well-known operational principles thereof a paper document 13 is positioned behind an ink ribbon 14 or the like which in turn is positioned immediately adjacent the type elements 11 over the print line portion thereof. The ribbon 14 may be fed in a suitable manner between spools 15 and 16 along the line of travel of the type elements 11. The paper document 13, however, is fed transversely to the direction of motion of the type. Guide bars 17 and 18 and carriage forms feed tractors 19 co-act to support and move the paper document 13 in the proper line of travel. Generally, printing occurs while the paper 13 is stationary relative to the print line. On completion of a print cycle, the paper 13 is advanced one or more spaces by the carriage tractors 19 to a position where a new line of data may be printed. The means for feeding the paper 13 in synchronism with operation of the print mechanism are well known in the art and may include a carriage drive motor 22 comprising, for example, dual motor units 22–1 and 22–2 or the like connected to shafts 20 by means of pulleys 21 or the like of the carriage tractors 19.

In the printer apparatus of FIG. 1, the arrangement shown is for a back printer. This arrangement is merely used by way of example and not by way of limitation, since the invention may be as readily used with a front printer. As shown, printing occurs when the paper 13 and ribbon 14 are impacted against the type characters on the type elements 11. The impacting occurs at various print positions along the print line to eventually form a complete line of data. For this purpose, a plurality of print hammers 24 are mounted behind the print medium 13. Print hammers 24 are arranged to be uniformly spaced so that one hammer 24 occupies each print position along the print line, and the hammers 24 are aligned in a single row parallel to the print line. Each print hammer 24 is a part of an individual hammer unit which comprises an electromagnet 26 with an armature 28 and a push rod connector element 30 with bias springs 32 which maintain the hammers 24 out of contact with the paper 13 when the electromagnet 26 is de-energized. Each hammer 24 is individually operable and the operation of the various hammers 24 occurs selectively at random positions along the print line in accordance with instructions from control means which comprises a type tracking device and a co-acting storage device which indicates the particular data to be printed. Further details of a suitable control system may be more fully understood by reference to U.S. Patent No. 2,993,437 of F. M. Demer and E. J. Grenchus for a High Speed Printer, which issued July 25, 1961.

Heretofore, control of the tractor drive motor 22 for advancing the paper 13 to the different line positions at which printing is desired had been controlled by means such as described in U.S. Patent No. 2,531,885 to A. W. Mills et al., which issued on Nov. 28, 1950, and is entitled, "Paper Feeding Device."

As therein described, control of the document feed was obtained by using a paper tape having a plurality of channels in which holes were punched at the particular line positions to which a skip operation was to be effected. A plurality of brushes aligned with these channels sensed the holes punched therein, and under the control of channel selecting commands from a processing unit, effected stopping of the document at the desired line positions.

The present invention provides for replacing the punched paper tape control system and its sensing brushes with a carriage control buffer 40 wherein are stored binary coded representations of the channels containing the different skip commands, these representations being stored at the respective line positions to which a skip operation is to be effected.

Figure 2A:
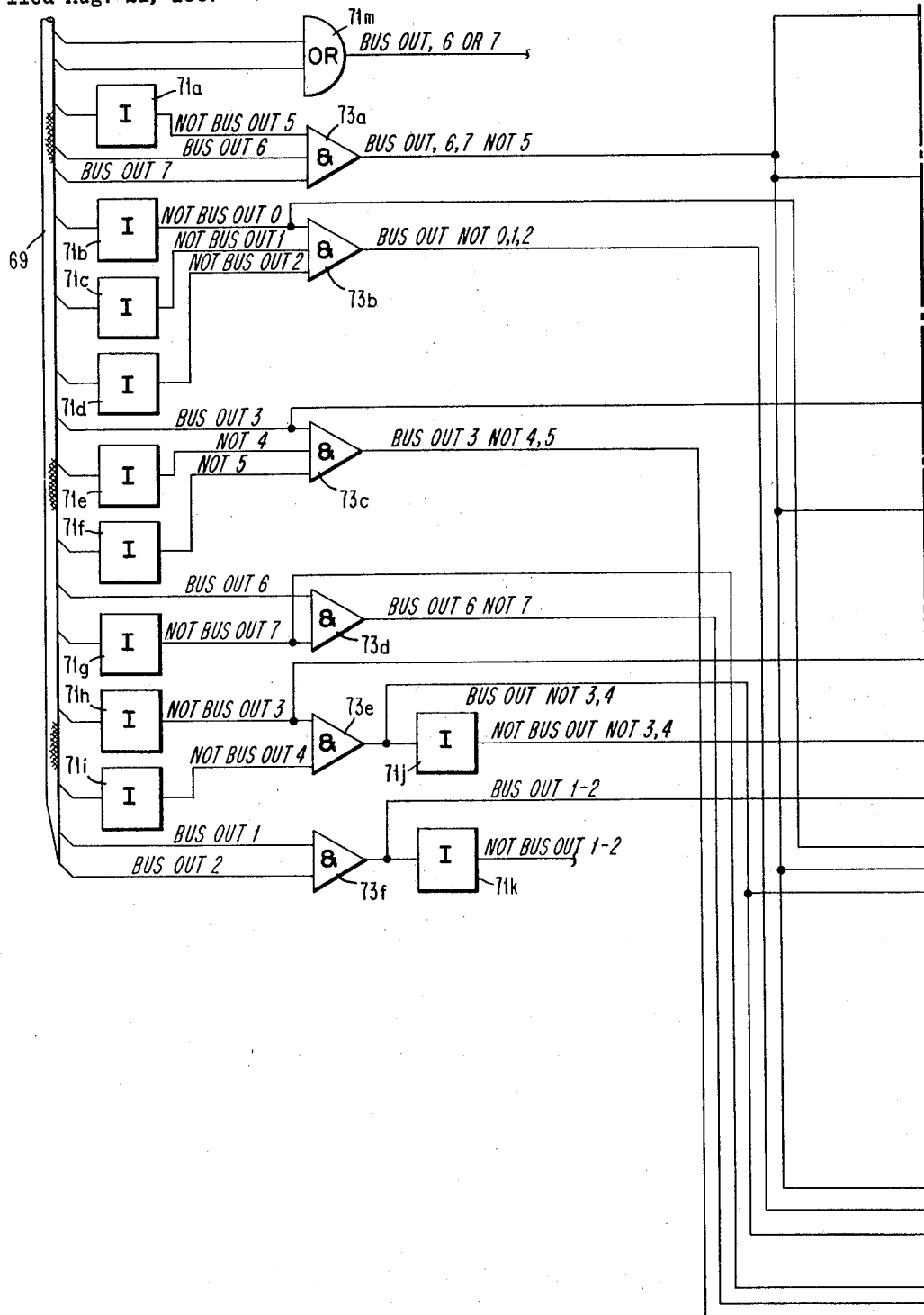
FIGS. 2a through 2t taken together provide a schematic circuit diagram of a tapeless carriage control system which may be used with the carriage of FIG. 1 and embodies the invention in one of its forms.
Figure 2B:
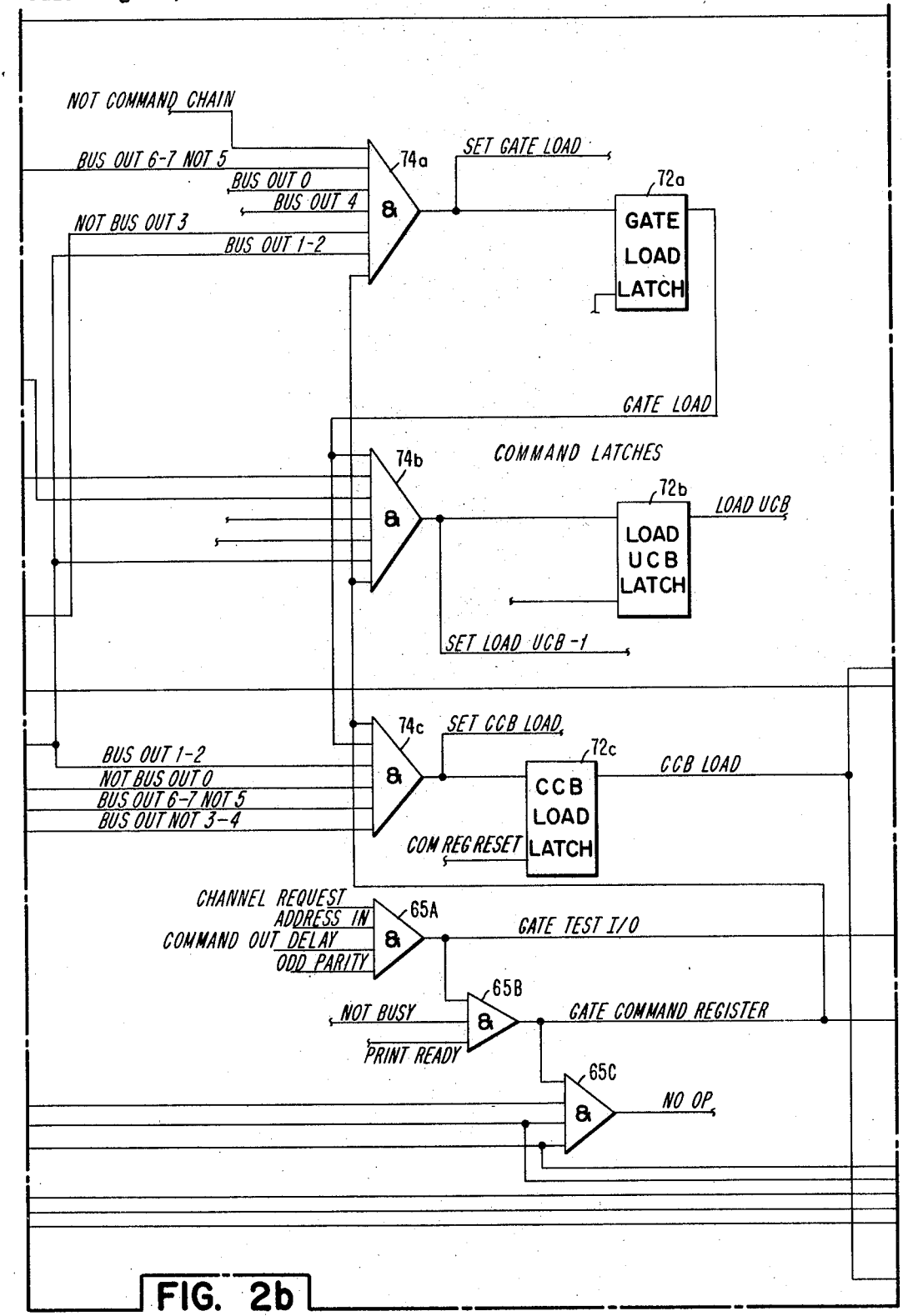
FIG. 2u is a block diagram showing the relationship between the principal elements of FIGS. 2a–t.
Figure 2C:
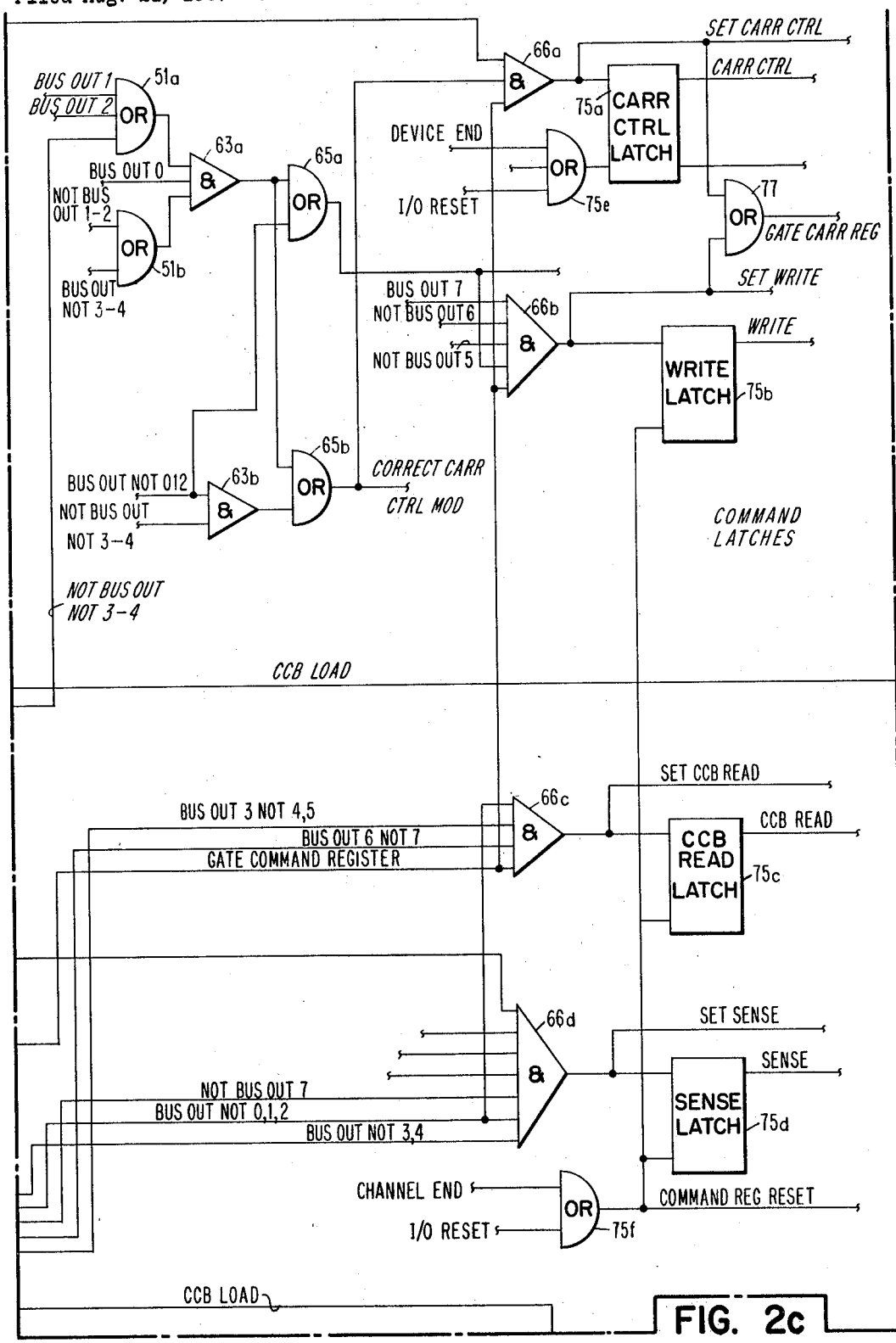

The Carriage Control Buffer 40 in the present instance is a 16×16 core array containing 256 bytes, with core planes for an end of document Flag bit, 1, 2, 4 and 8 bits and a parity bit. As shown in FIGS 2g and 2h, the buffer 40 is provided with a plurality of X drivers 42 and corresponding X switches 44 for providing drive current in the X direction. Y drivers 46 and Y switches 48 provide the corresponding Y drive. Inhibit drivers 50 and AND gates 51 are provided for selectively controlling the writing of information into the buffer 40 in response to data on the Carriage Control Buffer data bus 52. Sense amplifiers 54 and ANDs 55 provide for readout of the buffer 40, Flag, 1, 2, 4, 8 and P bit lines of the several core planes.

Figure 2D:
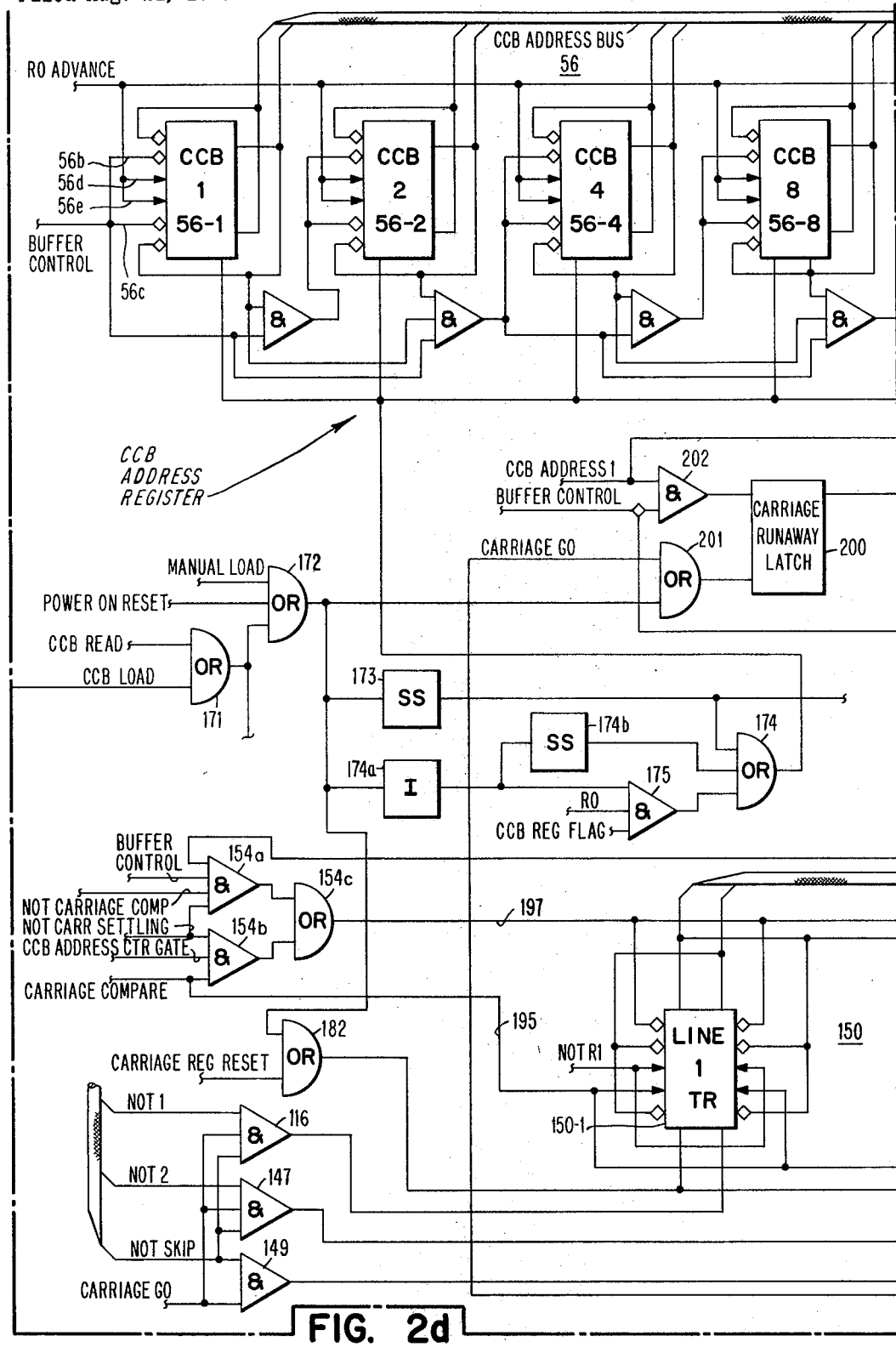
Figure 2E:
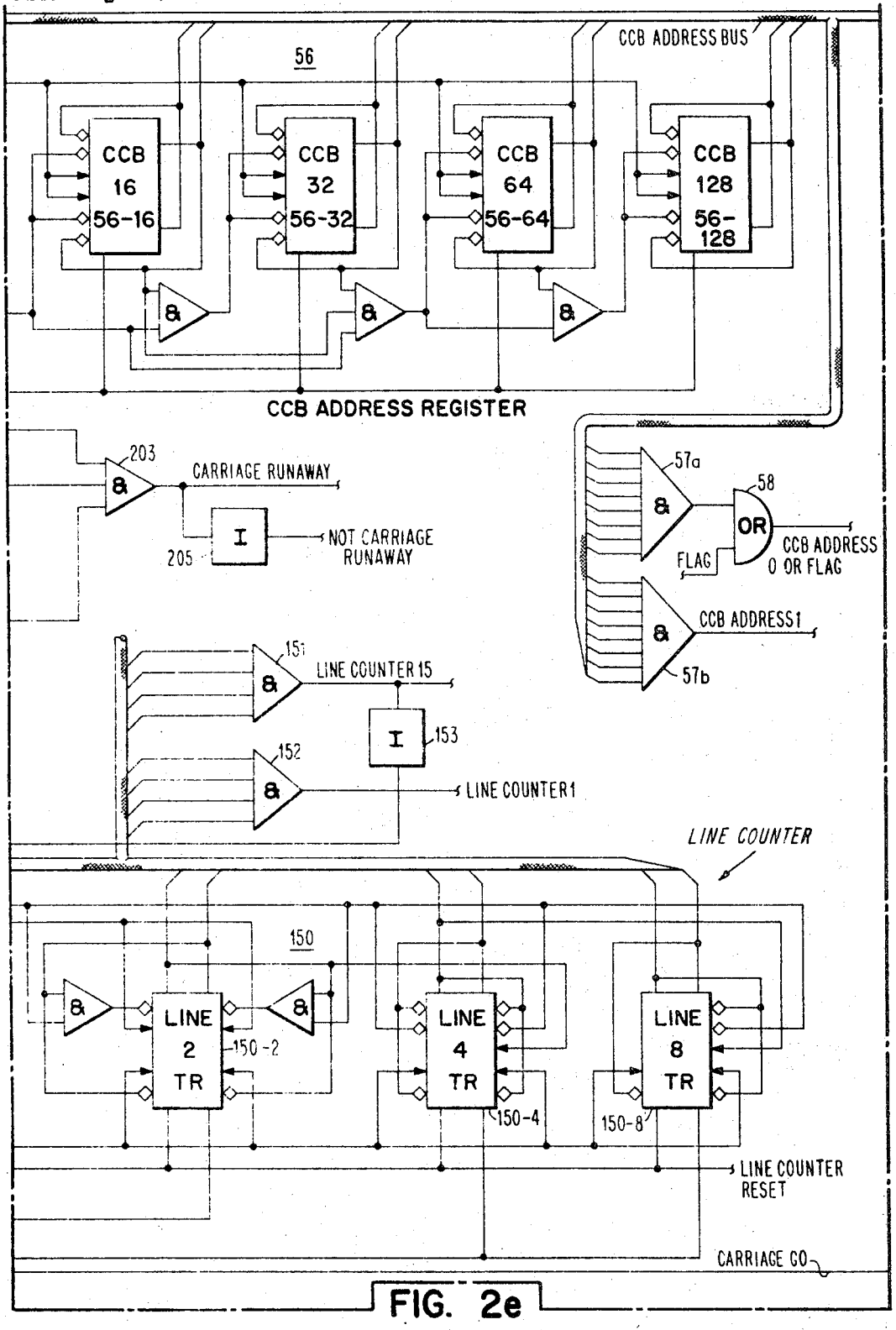
Figure 2F:
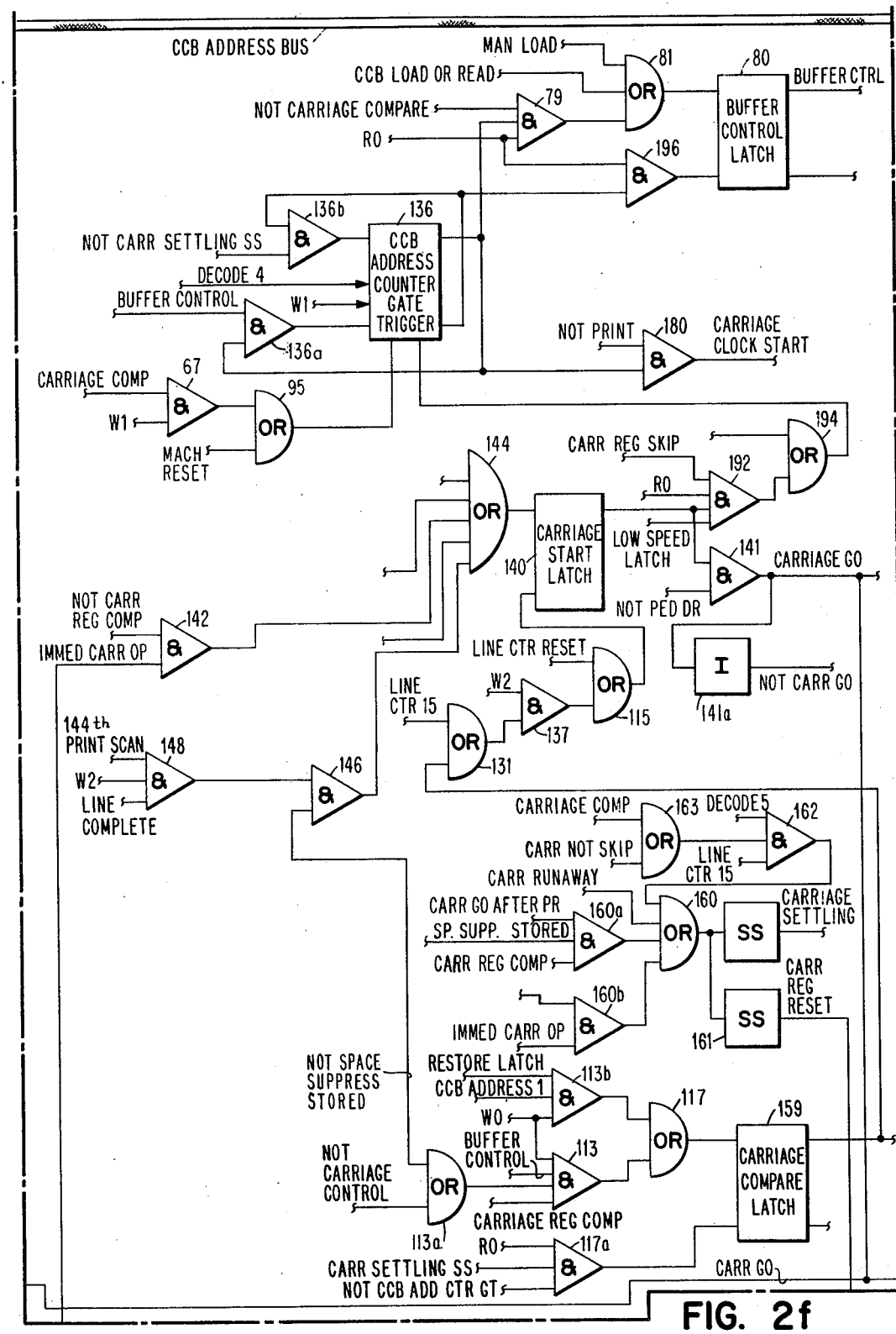
Figure 2G:
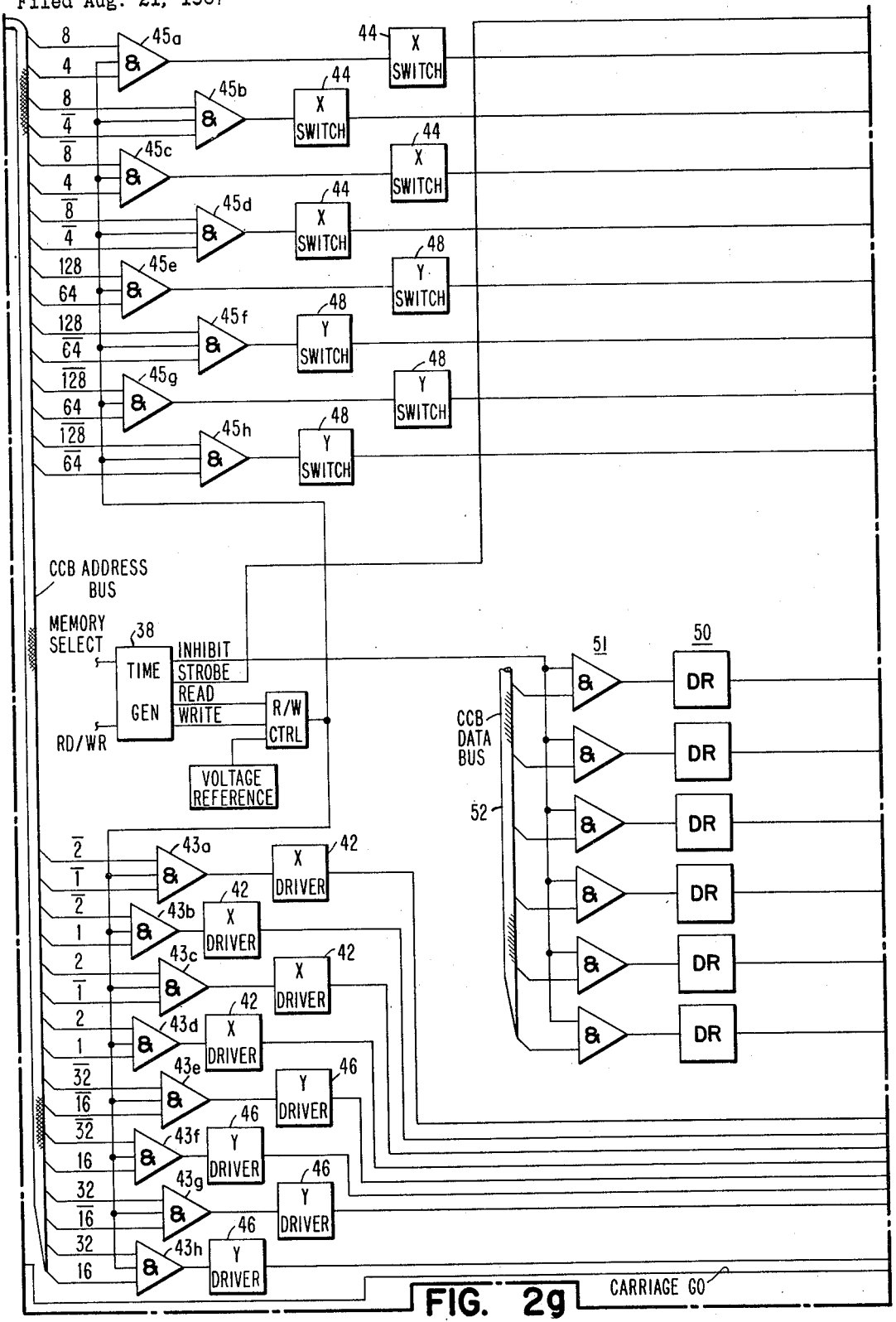
Figure 2H:
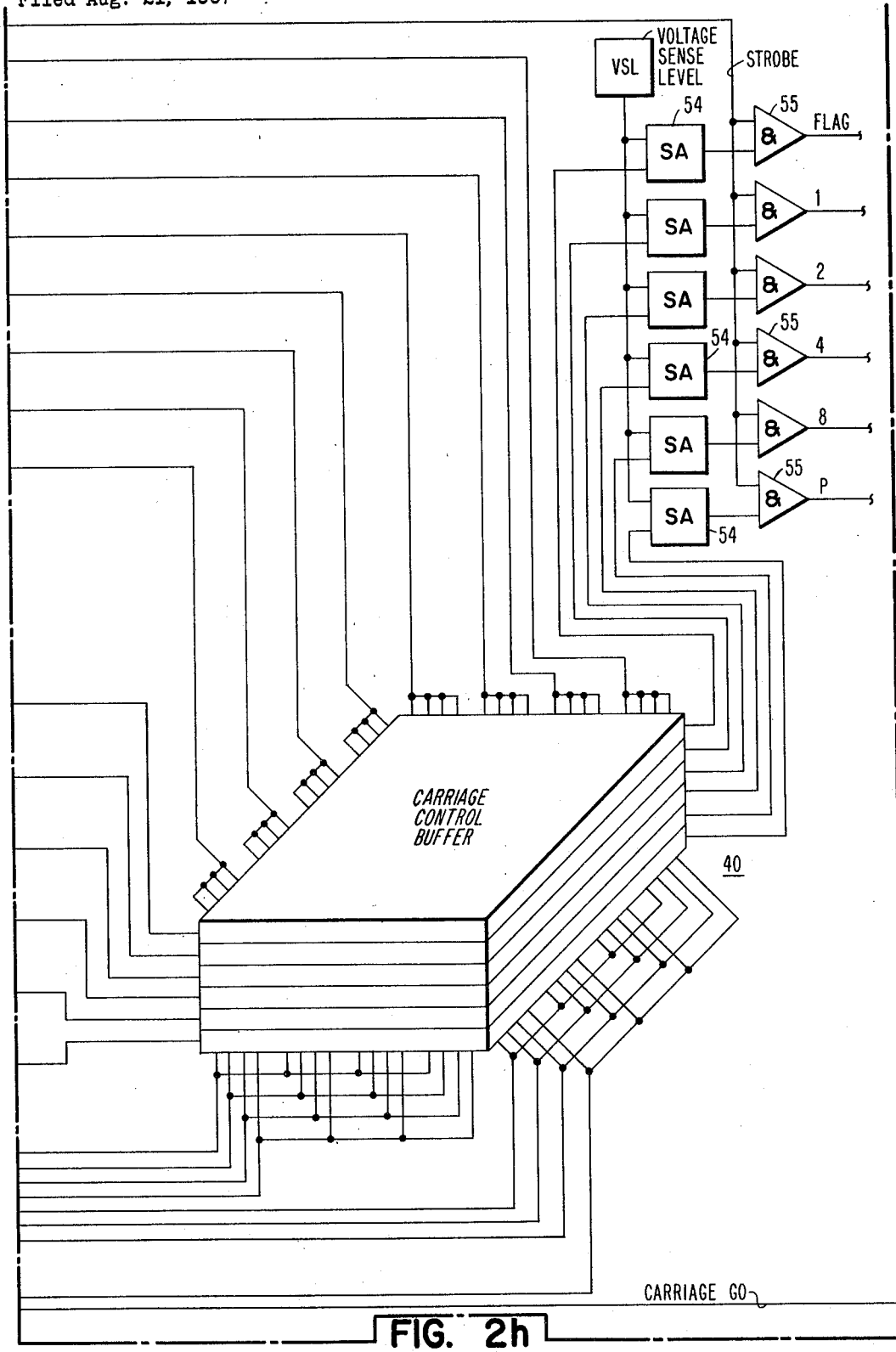

Addressing of the buffer 40 is effected by means of a CCB Address Register 56 shown in FIGS. 2d and 2e, and which comprises a plurality of triggers 56–1, 56–2, 56–4 through 56–128 arranged in a binary addressing fashion for addressing of the buffer 40. Triggers 56–1 and 56–2 are decoded by ANDs 43a–43d to form unique output lines for controlling the X drivers 42, while triggers 56–4 and 56–8 are similarly decoded by ANDs 45a–45d to control the X switches 44. Likewise, triggers 56–16 and 56–32 address the Y drivers 46 through ANDs 43e–43h while triggers 56–64 and 56–128 address the Y switches 48 through ANDs 45e–45h. The Address Register 56 is advanced by pulses from a clock 60 shown in FIGS. 2i and 2j, and which comprises a plurality of triggers 60–1 through 60–4 and decode ANDs 61a–61k with associated inverters 63a–d, single shots 63e–f, and drivers 63g–i. Drive of the clock triggers 60–1 through 60–4 is obtained from a Clock Run trigger 62 through AND 64 in conjunction with pulses from oscillator 36. The trigger 62 is set through AND 68 and OR 70 by an Adapter Start signal from OR 84 (FIG. 2n) during loading of the buffer 40 and by a Carriage Clock Start signal from AND 180 (FIG. 2f) during readout of the buffer 40.

Figure 2I:
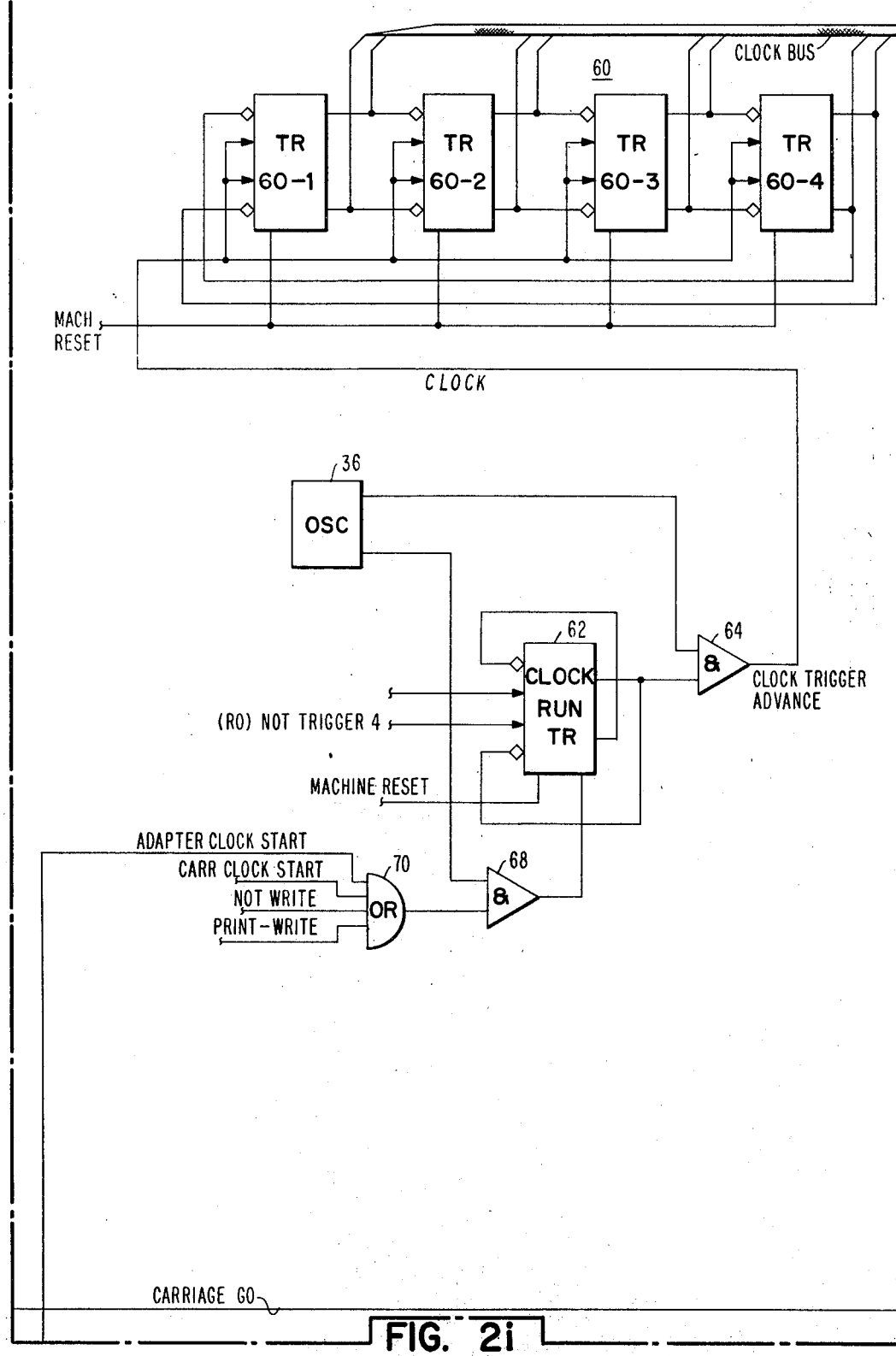
Figure 2J:
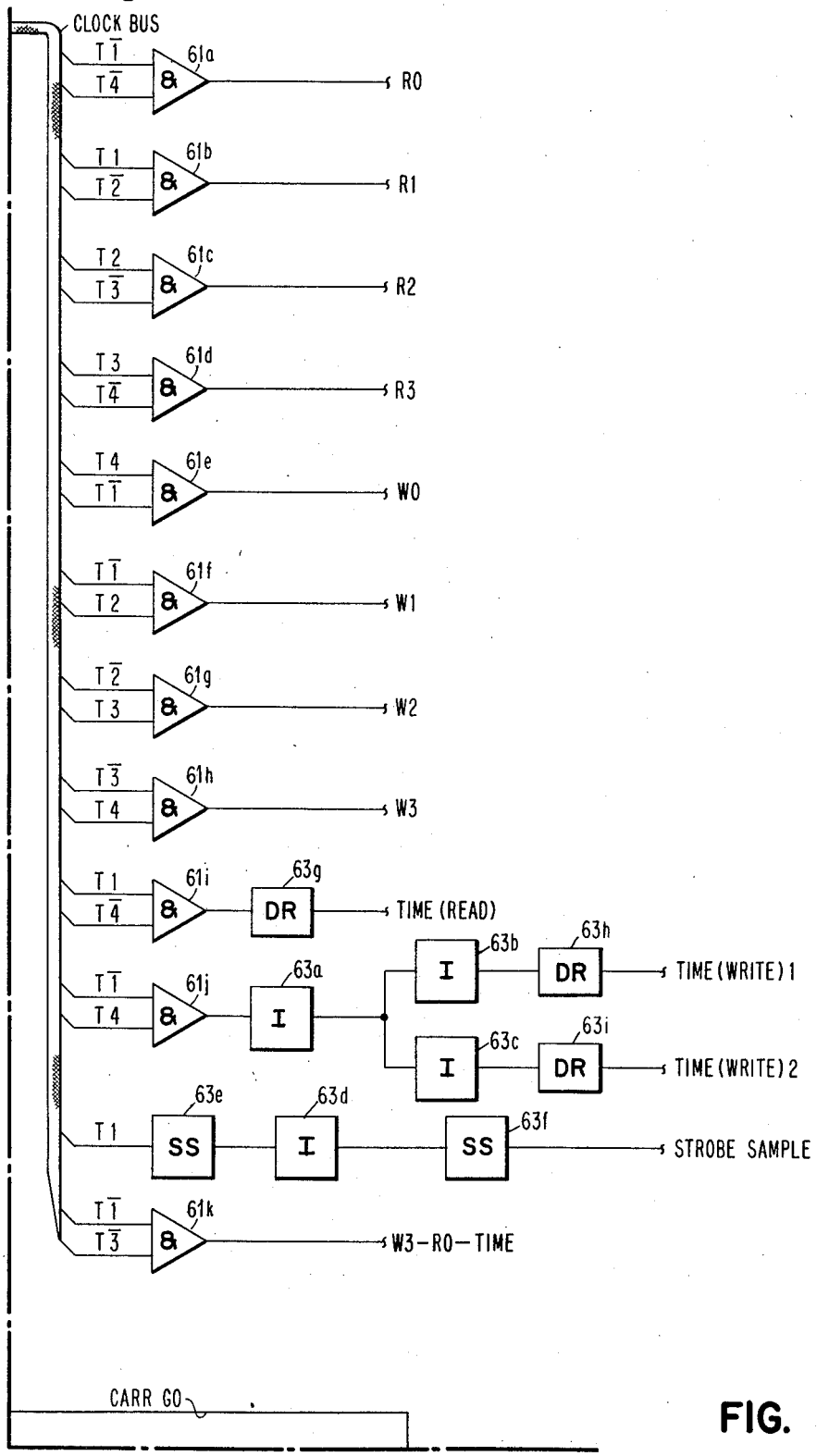

In order to avoid inadvertent modification of the Carriage Control Buffer contents, loading of the buffer 40 is effected in response to a CCB Load command which follows a specific channel tag line sequence which is sensed and stored in a Gate Load latch 72a shown in FIG. 2b and which must be set before the CCB Load latch 72c can be set. An UCB Load latch 72b also shown, controls loading of a universal character buffer (not shown). These latches 72a–c respond to commands on the Bus Out lines 69 through decode ANDs 74a–74c, respectively. AND 59 and OR 47 (FIG. 2p) provide an invalid CCB Address 1 signal at AND 59. Required NOT signals are obtained from the Bus Out lines 69 through inverters 71a–k and decode ANDs 73a–f. OR 71m provides a Bus Out 6 or 7 signal. Control of the CCB Address Register 56 during loading is effected by a Buffer Control latch 80, shown in FIG. 2f, which is set by the CCB Load signal through OR 81 or by the output of AND 79. Data from the channel is loaded under the control of the I/O tag lines Service-In and Service-Out which gate signals from OR 38c and one of ORs 39a–c (FIG. 2n) through AND 2 and OR 84 (FIG. 2n) which provides an adapter clock start signal for setting the clock trigger 62 (FIG. 2i). OR 39d provides an input to OR 84, while OR 39a also provides inputs to ORs 38a–c. Data is gated to a CCB register 83 (FIG. 2k) comprising a plurality of latches 83a–f for comparison through ORs 76a–h and ANDs 77a–c with command signals in a Command Register 78 (FIG. 2l), comprising latches 78a–e which are controlled from the Bus Out 69 through ORs 85a–f and decode ANDs 86a–k from the system Bus Out 69 with the following byte relations.

| Bus bit: | CCB Register Bit |
|---|---|
| 4 | 8 |
| 5 | 4 |
| 6 | 2 |
| 7 | 1 |
| 3 | F |

The data is gated to the register 83 by means of a plurality of ANDs 87a through 87l and ORs 88a–f to the latches 83a–f and to the CCB data bus 52 for controlling the inhibit drivers 50 for storing data bits in the several planes of the different positions in the buffer 40 of FIG. 2h. ANDs 87m and 87n provide gating signals to different ones of the ANDs 87a–l for manual and normal operations, respectively. Exclusive ORs 89a–e in conunction with AND 89f provide a parity bit for the latch 83a. Reset of latches 83a–f is provided through AND 90.

Readout of the CCB Buffer 40 in connection with carriage operations may occur with or without printing. Operation of the carriage tractors 19 is effected by energizing the motor windings 22a–d and 22A–D (FIG. 2t) of a dual carriage motor 22–1, 22–2 of FIG. 1, and which may comprise stepper motors of a well-known type, through a plurality of ANDs 94A, 94$\overline{A}$, 94B and 94$\overline{B}$ (FIG. 2s) in response to energization of carriage drive pulse circuit 96 comprising stepping triggers 96A and 96B as shown in FIG. 2s as described in more detail in the co-pending application Ser. No. 661,930 of Roger C. Hull and Eugene T. Kozol, filed Aug. 21, 1967. These triggers 96A, 96B are sequentially stepped in response to a Stepper Motor Advance signal from AND 98 through OR 100, in response to an Initial Advance signal from a signal shot 102, or pulses from a plurality of emitter pick up heads 103, 104, and 106 associated with a slotted emitter disc 111 driven by motor 22–1, 22–2 through amplifiers 108a–c, single shots 109a–b, and ANDs 110a–g (FIG. 2r). The outputs from the emitter heads 103, 104, 106 are gated by means of output signals from ANDs 112 and 114 from a Low Speed latch 120, a High Speed latch 122, and/or an Ultra High Speed latch 124 (FIG. 2t). Selective control of these High and Ultra High Speed latches 122, 124 is effected through ANDs 121a–d, ORs 123k–q, and ANDs 123a–j, inverter 125 and single shot 128, in conjunction with ORs 126a and 126b. Low Speed Latch 120 is set by Carriage Go signal from AND 141 (FIG. 2f) and is reset through OR 120a. Shift Latch 126 which is controlled by single shots 127a and 127b inhibits the Low and High Speed latch outputs momentarily when downshifting to a lower speed by a Carriage Counter 130 (FIG. 2r) comprising a plurality of triggers 130a–c advanced in a binary fashion by feedback pulses from the AND 98, and which through a decode circuit of ANDs 132a–c provides decode 4, decode 5, and decode 7 output signals, respectively. ANDs 123a–h and ORs 123k–p provide decode logic for controlling the latches 122 and 124 when stopping. ANDs 123i, 123j and OR 123q provide for reset of the shift latch 126. The Ultra High Speed emitter signal is produced from the High Speed emitter head 106 by inverting it through inverter 105 to drive single shot 107. Stop pulses are provided through ANDs 110a–c by stop circuits 133, 134, and 135 each of which comprises, as shown for circuit 133, a plurality of cascade arranged single shots 133a, b, c and d with associated inverters 133e and f and OR 133g to provide a series of three stop pulses. OR 191 and ANDs 94A, 94$\overline{A}$, 94B and 94$\overline{B}$, serve to inhibit drive to the motor 22–2 when the Pedestial Drive signal from OR 191 (FIG. 2t) is removed by the Low Speed Latch 120 being turned off. As used herein an invert I inverts an input signal; an AND requires coincidence of two or more input signals for an output; and OR provides an output for any of two or more inputs; and a single shot provides a timed output pulse for any input signal. OR 191 and ANDs 94A, 94$\overline{A}$, 94B and 94$\overline{B}$ serve to inhibit drive to the motor 22–2 when the Pedestal drive signal from OR 191 is removed by the Low Speed Latch 120 being turned off.

DESCRIPTION OF OPERATION

Operation of the clock 60 (FIG. 2i) during readout operations is effected under the control of a Carriage Control Buffer Address Counter Gate trigger 136 (FIG. 2f) which is set by the decode 4 signal from the decode circuit AND 132a. Operation of the carriage drive circuit 96 (FIG. 2s) is effected by means of a Carrier Start latch 140 (FIG. 2f) which is turned on either by an Immediate Carriage Go signal from single shot 138 and AND 139 (FIG. 2g) or by a Carriage Go After Print signal from AND 148 (FIG. 2f) if a print operation is involved. These signals set the Carriage Start latch 140 through OR 144 and AND 142 or AND 146, respectively. Set of the Start Latch 140 provides a Carriage Go pulse through AND 141 for setting the Low Speed latch 120 (FIG. 2t) to start carriage operation. Stopping of the carriage is effected by resetting the Low Speed latch 120 through operation of a Line Counter 150 (FIGS. 2d–e) which comprises a plurality of triggers 150–1, 150–2, 150–4, and 150–8 arranged in a binary stepping fashion. AND's 151 and 152 provide Line Count 15 and Line Count 1 signals, respectively. Inverter 153 is used to inhibit further advance of the counter 150 when a count of 15 is reached without a compare, through AND 154a.

The Low Speed latch 120 (FIG. 2t) is reset by a Carriage Register Reset signal generated at single shot 161 through OR 160 (FIG. 2f), in response to the output of a Stop AND 162 which responds to the decode 5 and line counter 15 signals with a carriage Not skip signal from OR 163.

Status latches 164a–d (FIG. 2p) provide Busy Channel End, and Device End Gate and Device End signals, indicative of the operating condition of the apparatus. through decode ANDs 165a–g and associated ORs 166a–g and ANDs 92 and 185. Sense latches 176a–e (FIG. 2q) provide indications of error conditions.

Tag line signals represented by the Service-In and Status-In signals are produced by tag line latches 168a, 168b (FIG. 2o) for control purposes, through decode ANDs 169a–g and ORs 170a–e. Bus assembly circuits are provided in FIGS. 2m–n, including decode ANDs 157a–f, AND's 158a–q ORs 167a–l, and line drivers 155a–j for assembling the Bus In Bits. Parity bit for the Bus In is provided by Exclusive OR's 178a–g, inverter 179 and AND 181. Bus Out parity check is provided by Exclusive ORs 189a–h through line receivers 156a–i.

In operation, the Carriage Control Buffer 40 (FIG. 2h) is loaded in response to a CCB Load command through decode AND 74c (FIG. 2b) from over the Bus Out lines 69 which sets the CCB Load latch 72c, provided that the CCB Gate Load Latch 72a has been previously set by a command through decode AND 74a (FIG. 2b). The CCB Load latch 72c initializes the operation by resetting the CCB Address Register 56 (FIGS. 2d–e) to address 1 through ORs 171, 172, single shot 173, and OR 174 and sets the Buffer Control latch 80 through OR 81 (FIG. 2f). The Buffer Control signal gates the triggers 56–1 and 56–2 of the CCB Address Register 56 at each RO time to permit sequencing of the CCB addresses in each clock cycle.

Figures 3, 7:
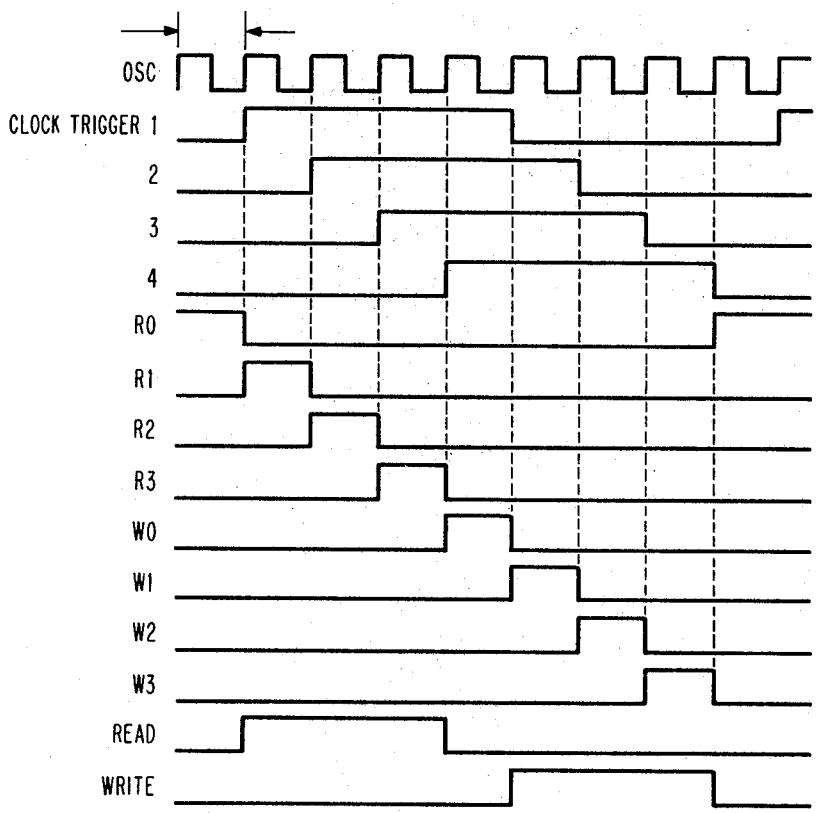
FIG. 3 is a block diagram showing the arrangement of FIGS. 2a through 2t.
FIG. 7 is a clock timing chart.

Since the command to load the buffer 40 has been stored in latch 72c (FIG. 2b), and the buffer address has been modified to the correct starting point, buffer byte 1, the control system is prepared to receive data from the channel (Bus Out 69). The data is loaded under the control of the I/O tag lines Service-In and Service-Out through AND 82 (FIG. 2n), which produces the Adapter Clock Start signal at OR 84. This sets the Clock Run trigger 62 (FIG. 2i) through OR 70 and AND 68, starting the clock 60 and permitting it to take one cycle. The Clock Run trigger 62 resets at the fall of trigger 60-4 of the clock 60, which corresponds to RO time as shown in FIG. 7. Since the clock cycle is two microseconds, which is less than the minimum data period for a byte of data received from the Bus Out lines 69, the clock 60 will return to RO before the next data byte is available.

Figure 2K:
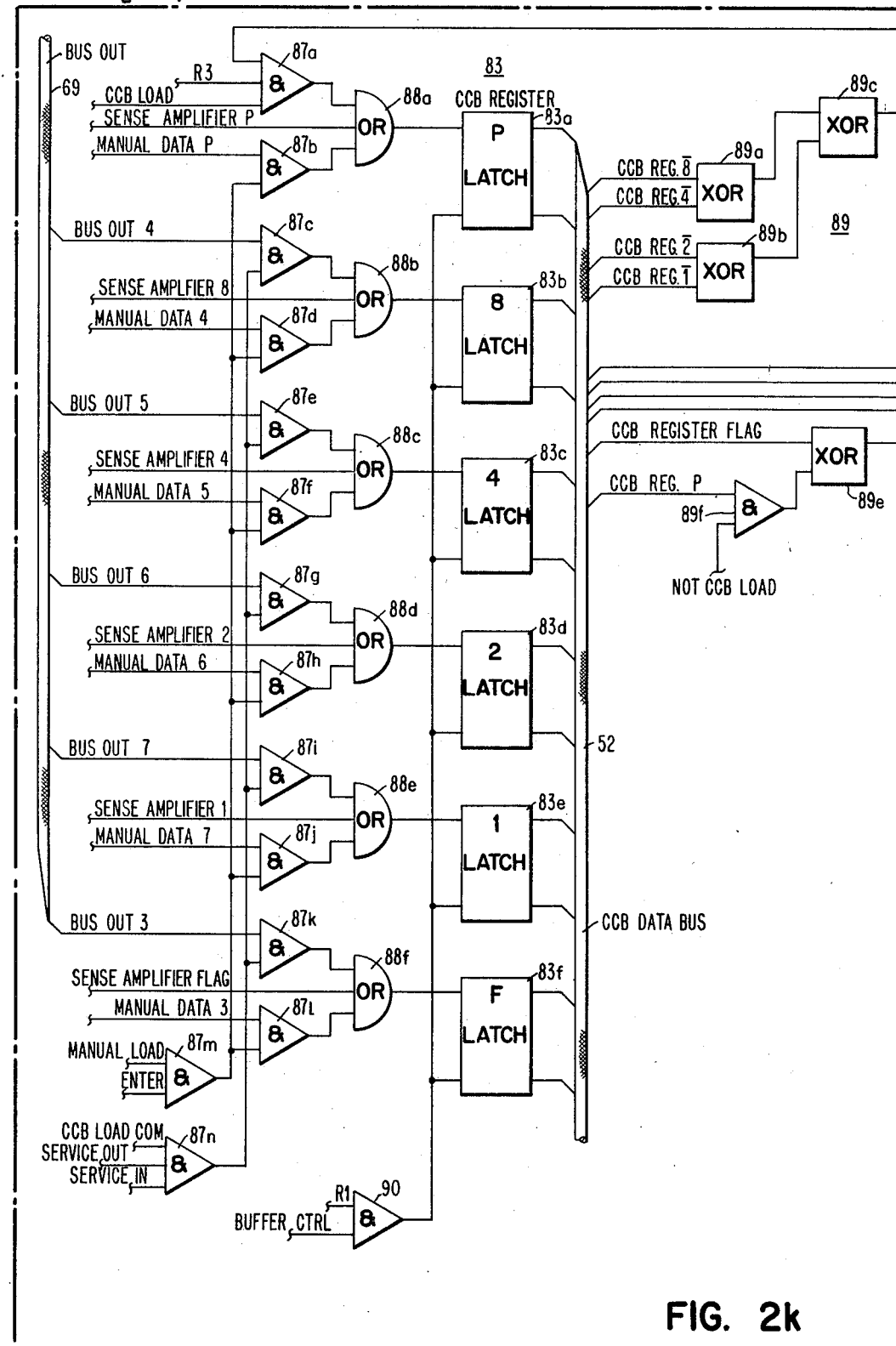
Figure 2L:
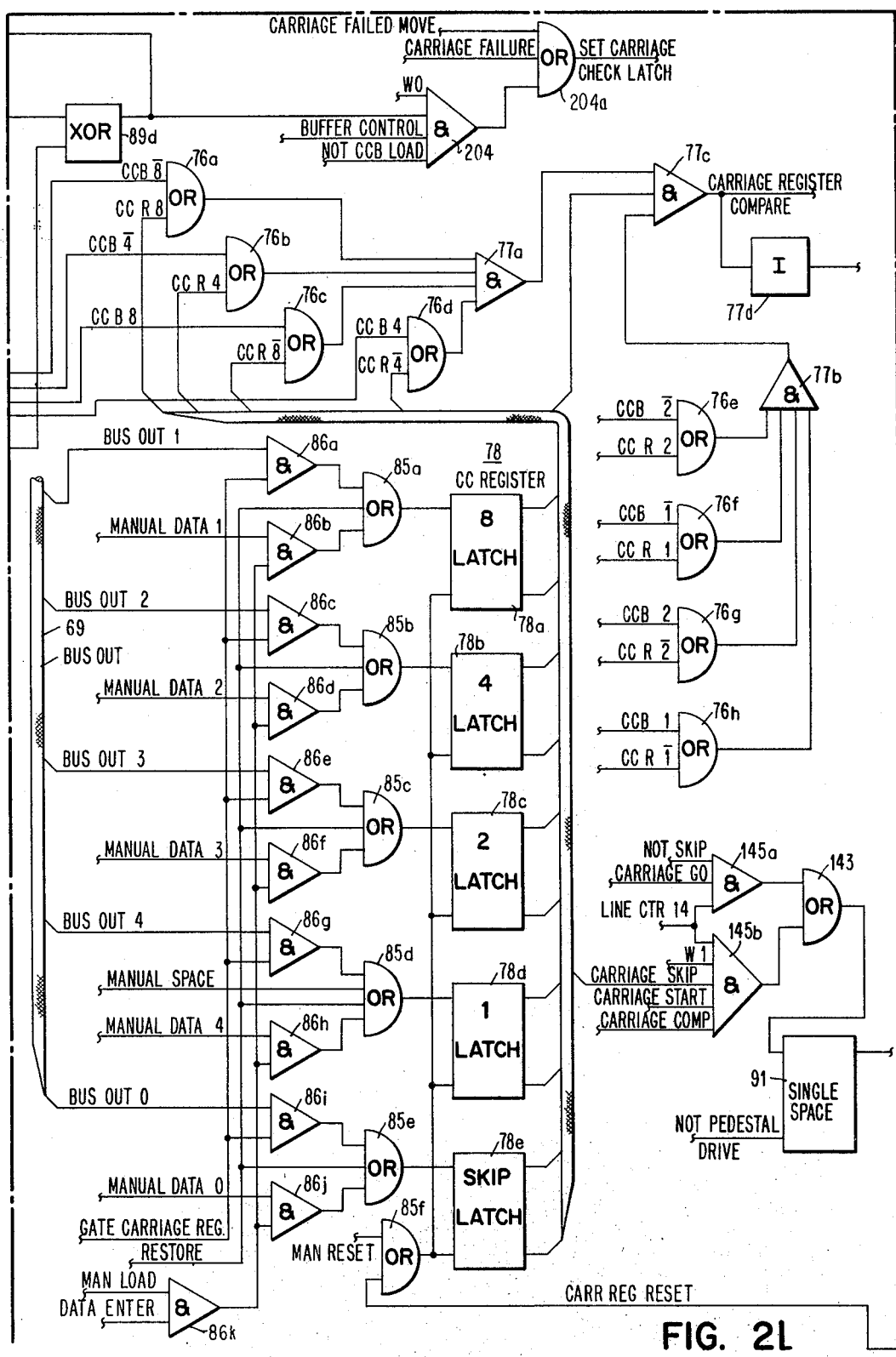
Figure 2M:
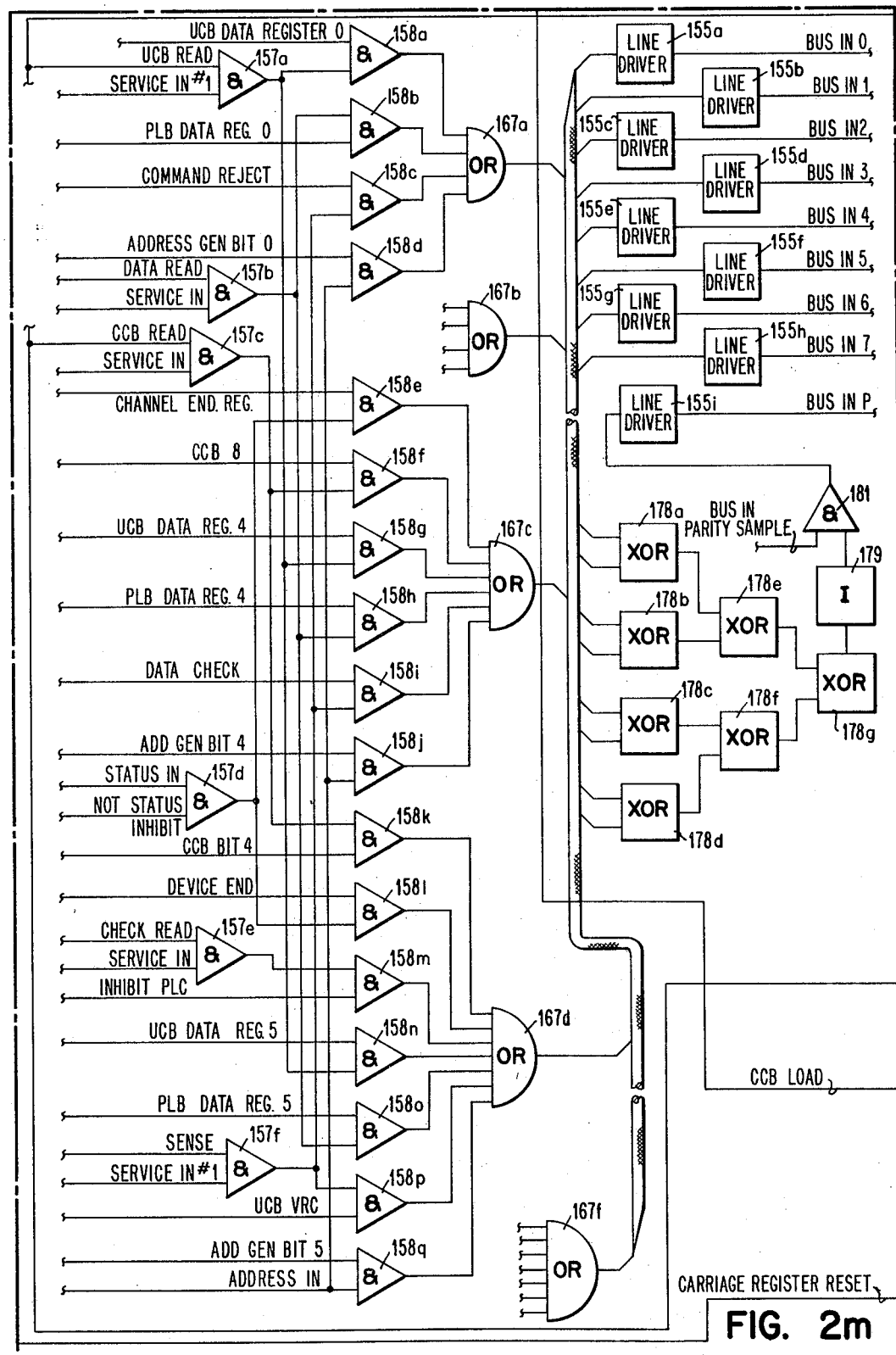

A CCB parity bit is generated from the CCB register 83 contents and is inserted in the bit latch 83a of the register 83 on an odd parity basis through the exclusive ORs 89a–d of parity circuit 89 (FIGS. 2k–l). The x–y drivers and switches 42, 46, 44, and 48 (FIG. 2g) are turned on to read by a Read signal at R1, R2 and R3 time as shown by the timing chart in FIG. 7. However, the contents of bit 1 in the Carriage Control Buffer 40 are not recycled because in loading the buffer 40 a Strobe signal (which is a delayed Read signal used to gate the sense amplifiers 54 (FIG. 2h) and is produced by a time generator 38 (FIG. 2g) in response to a Read signal (RD), and this rises only on a Read operation) does not occur, and the output of the sense amplifiers 54 is not gated in ANDs 55, so that the old contents of the Carriage Control Buffer 40 are erased during loading.

As described previously, data is loaded starting from position 1, and reset of the CCB Address Register 56 occurs with the coincidence of RO and the CCB flag bit indicating the end of the line to be printed from AND 175 through OR 174 (FIGS. 2d–e). The clock 60 (FIG. 2i) continues through the end of the current cycle and at RO the CCB Address Register 56 will be advanced to position 2. The contents of position 1 remain in the CCB register 83. Should a program error occur during loading, as evidenced by the 0, 1, or 2 bits on Bus Out, a program error is indicated by Invalid CCB Load generated by latch 176b through OR 173a, AND 177c and OR 173b. (FIG. 2g). Other sense latches 176a, 176c, 176d, and 176e function with AND 177a and OR 173c to produce a Command Reject signal; with OR 173d and AND 177b to provide an Invalid Flag signal; and with OR 173e to provide a CCB Parity Check and a Carriage Failure Check. AND 177d provides another input to OR 173a.

Carriage operations may occur with or without printing. The carriage commands shown in FIGS. 6a and 6b reflect this by describing the byte structure for an operation with a print command or for a carriage command alone. If the function is to Space/Skip immediate the Carriage Control latch 75a (FIG. 2c) is set through AND 63b, OR 65b, and decode AND 66a. Reset is effected by Device End or I/O Reset signals through OR 75e. If a Write and Space/Skip command is sensed, the Write latch 75b will be set through OR 51a, and OR 51b, AND 63a, OR 65a and decode AND 66b. In either case, a carriage function is indicated so that Gate Carriage Register signal rises at OR 77 (FIG. 2c) to permit loading of the bus-out bits from Bus Out 69 to the Carriage Command register 78 (FIG. 2l) through ANDs 86a, c–e–g and i. Decode ANDs 66c and 66d provide control of CCB Read Latch 75c and Sense Latch 75d, respectively.

To perform a carriage function, the Carriage Start latch 140 (FIG. 2f) is set through OR 144 either by the Carriage Go After Print signal from AND 146 and AND 148, or the Immediate Carriage Go signal from AND 142 through single shot 138 and AND 139 (FIG. 2g) when a carriage command bit configuration exists from Bus-Out 69 and the Command-Out tag line rises. If the carriage is not already in motion, Carriage Start latch 140 start it by bringing up Carriage Go at AND 141 (FIG. 2f). The carriage will be started in the low speed mode by the Carriage Go signal setting the Low Speed latch 120 (FIG. 2t).

Figure 2N:
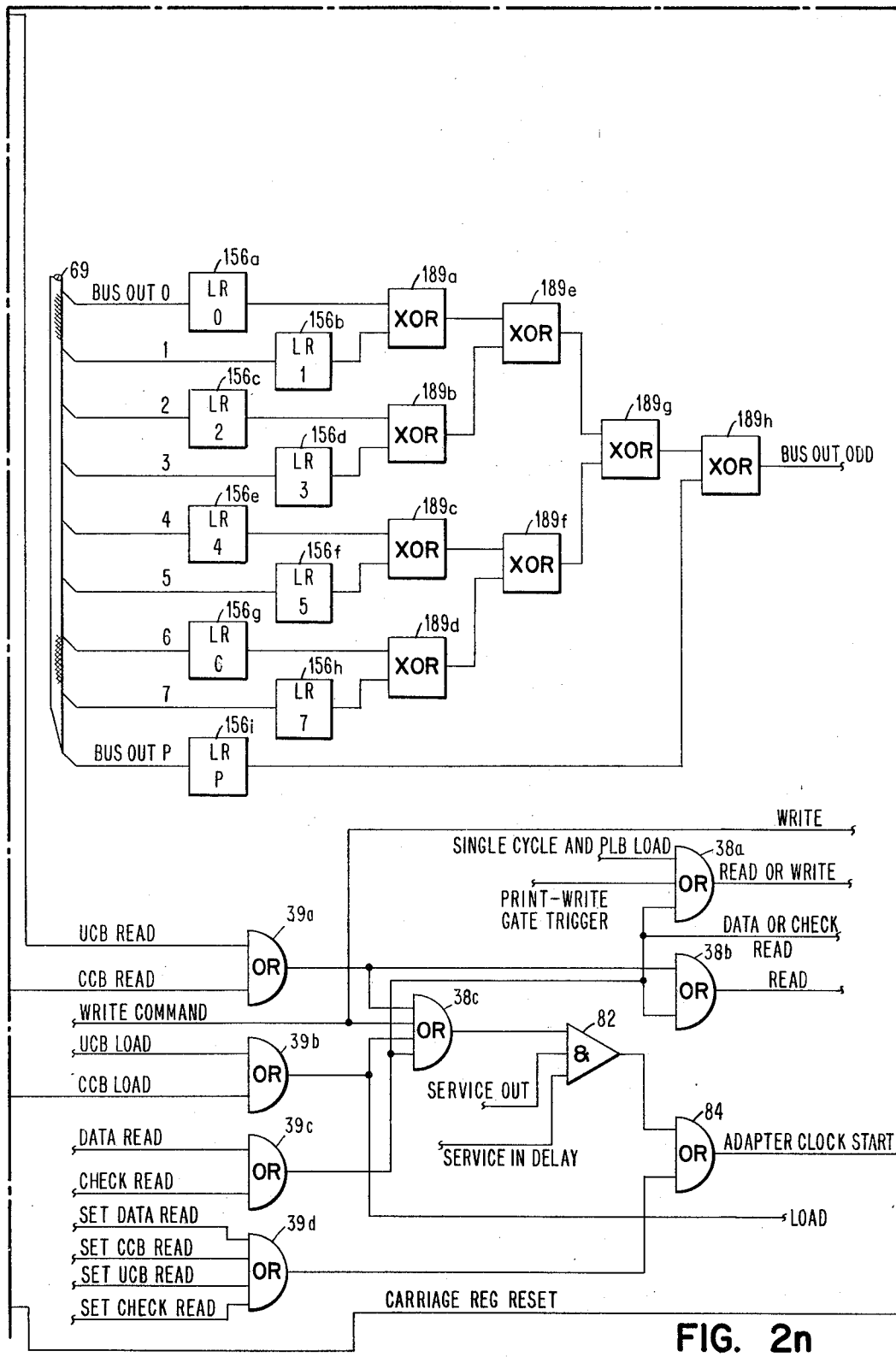
Figure 2O:
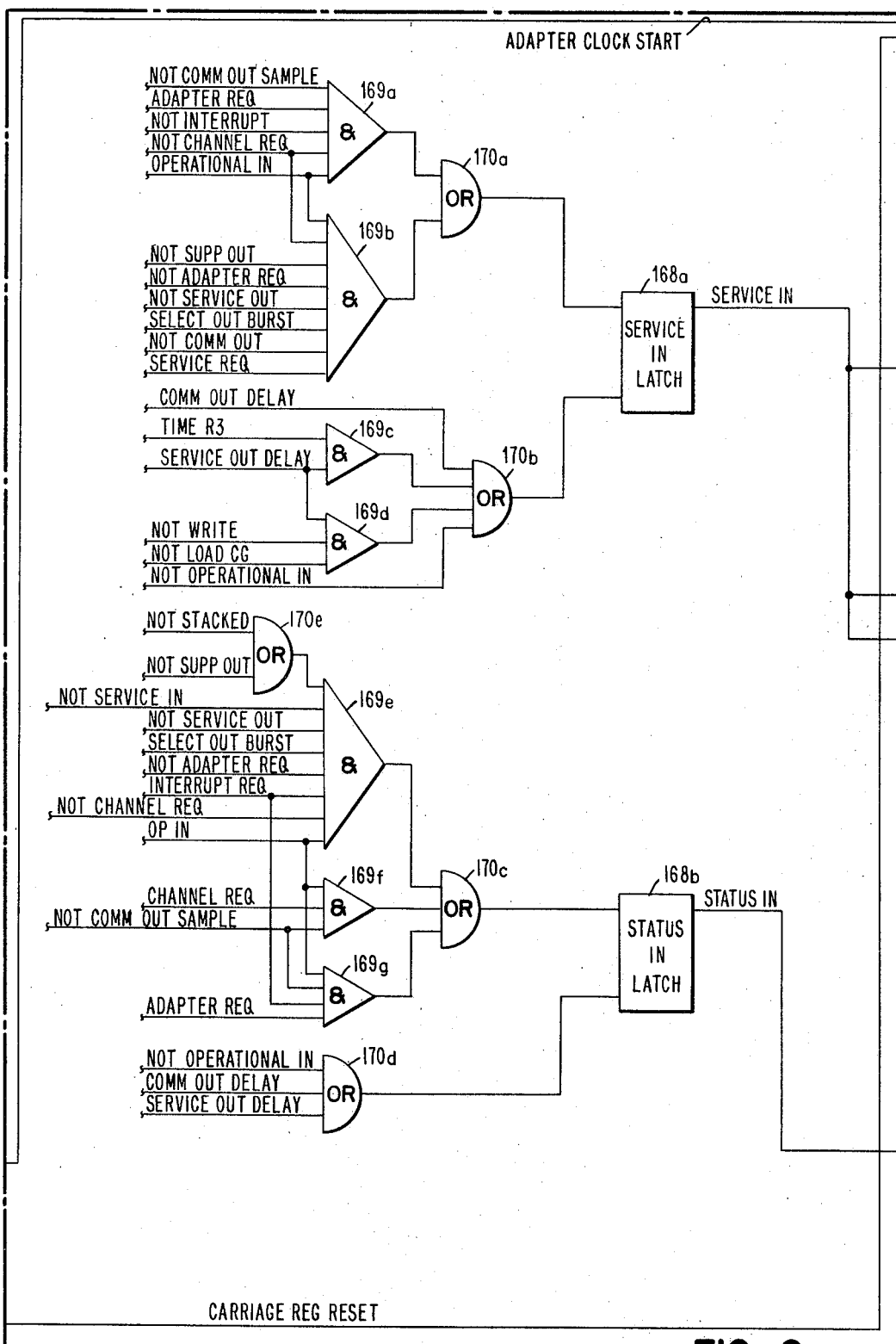
Figure 2P:
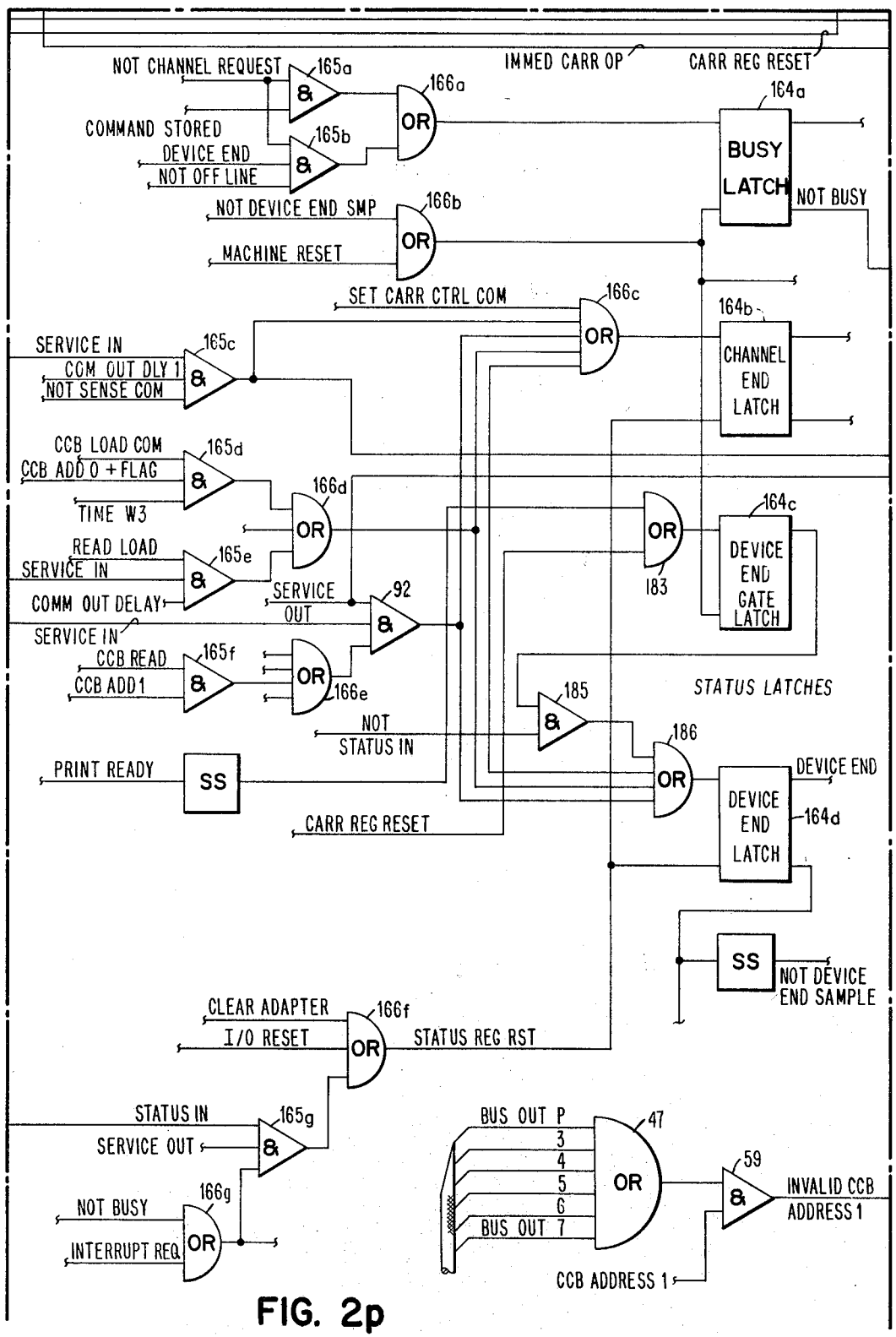
Figure 2Q:
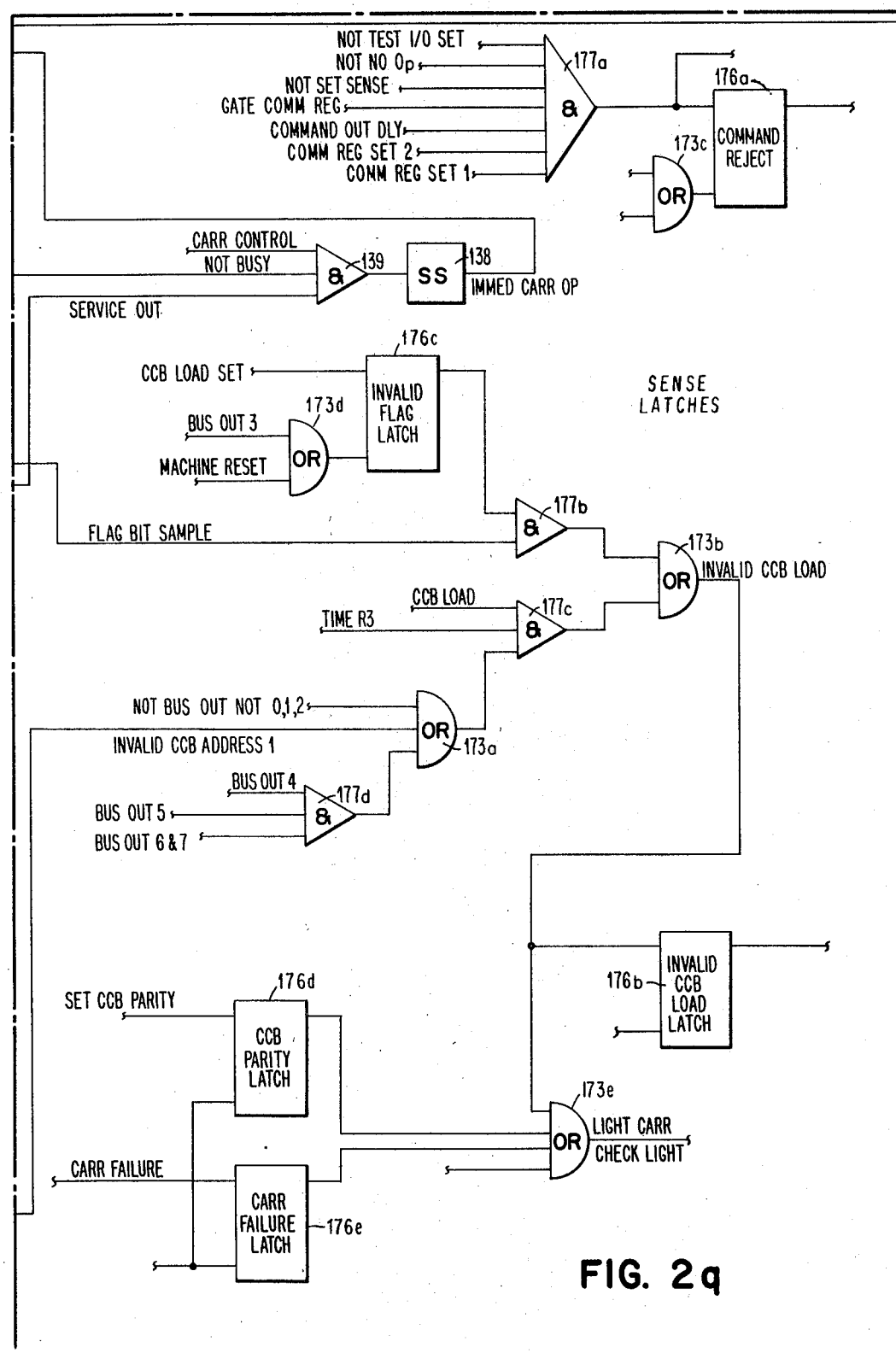
Figure 2R:
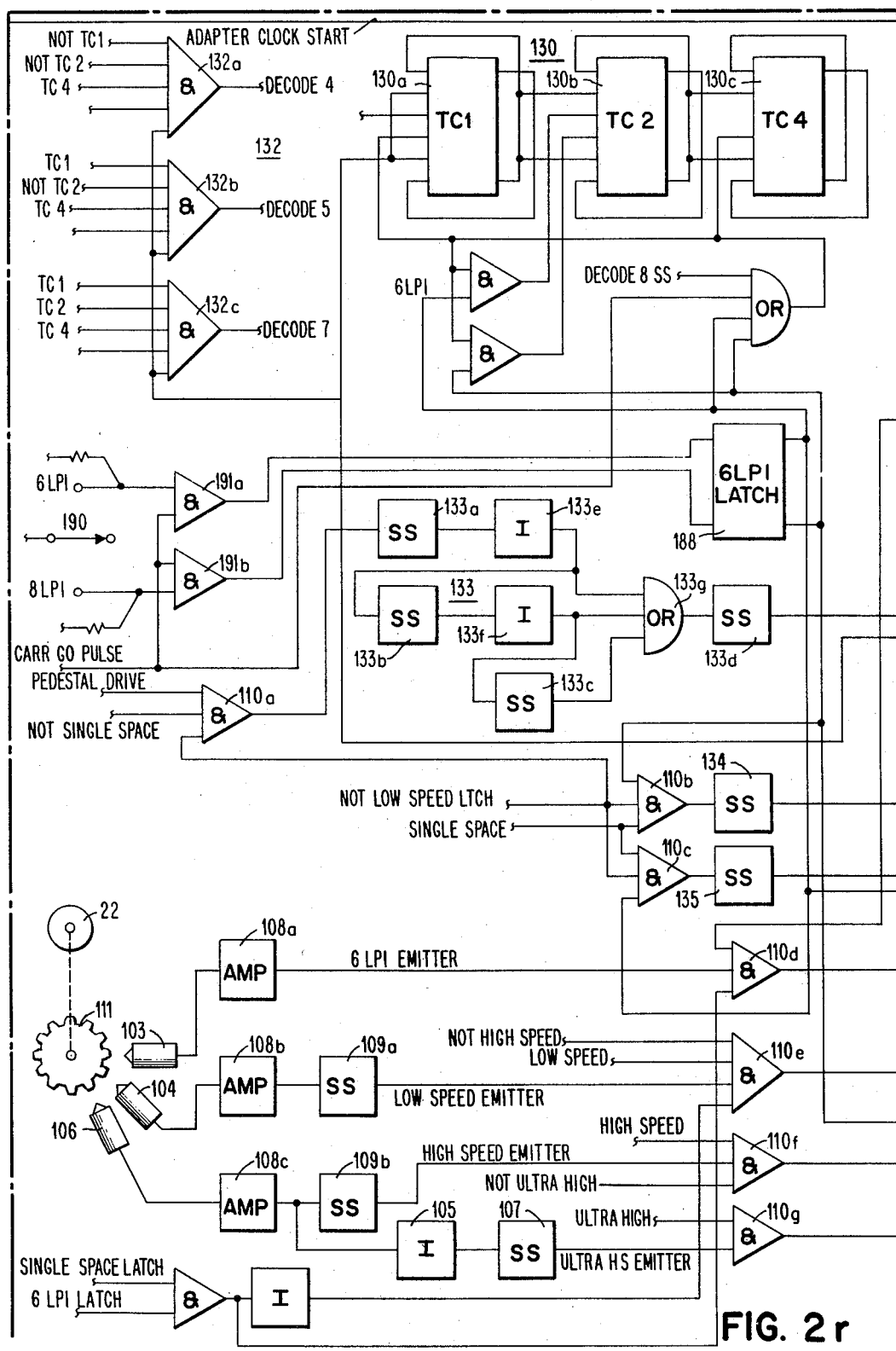
Figure 2S:
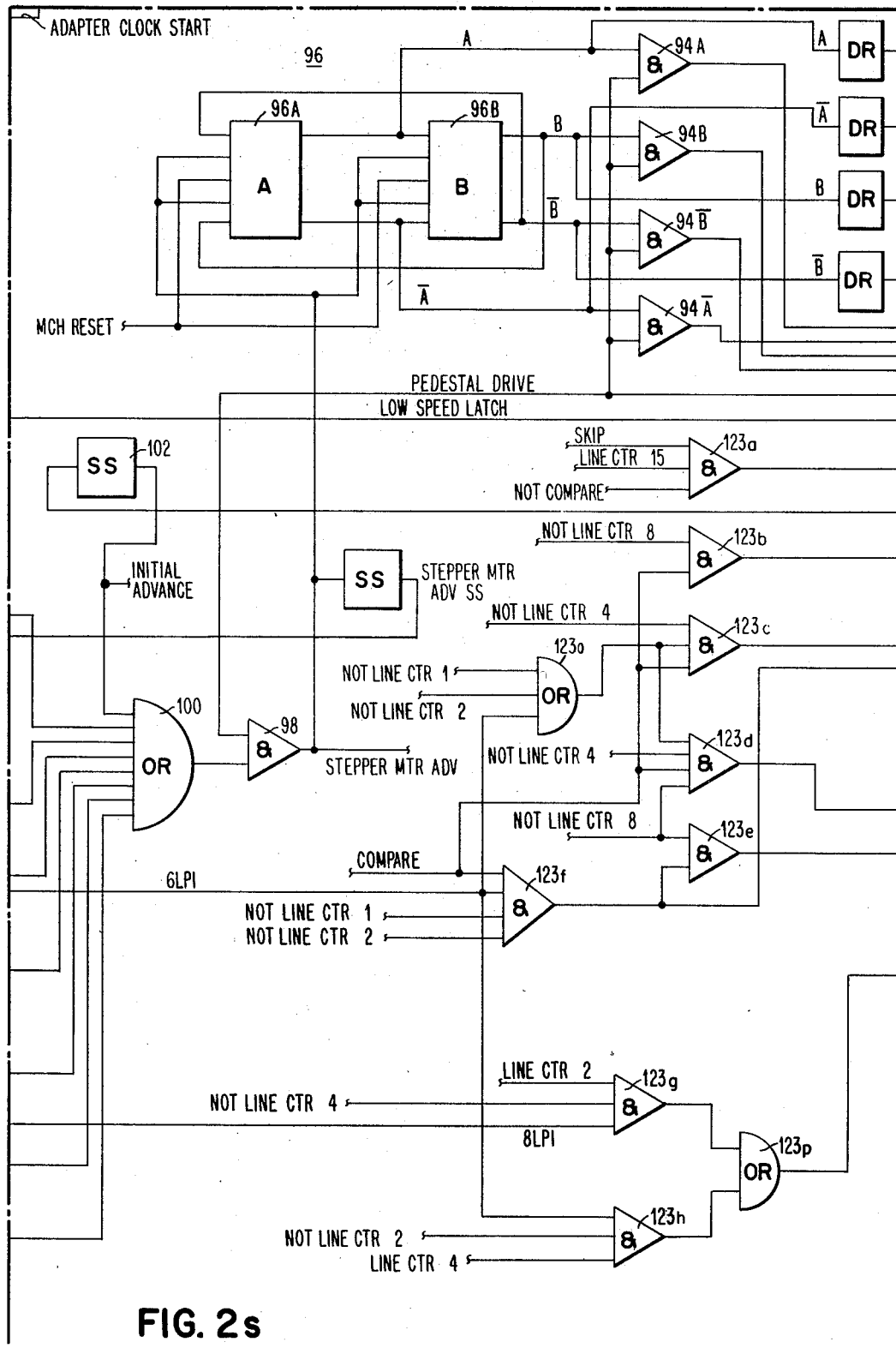
Figure 2T:
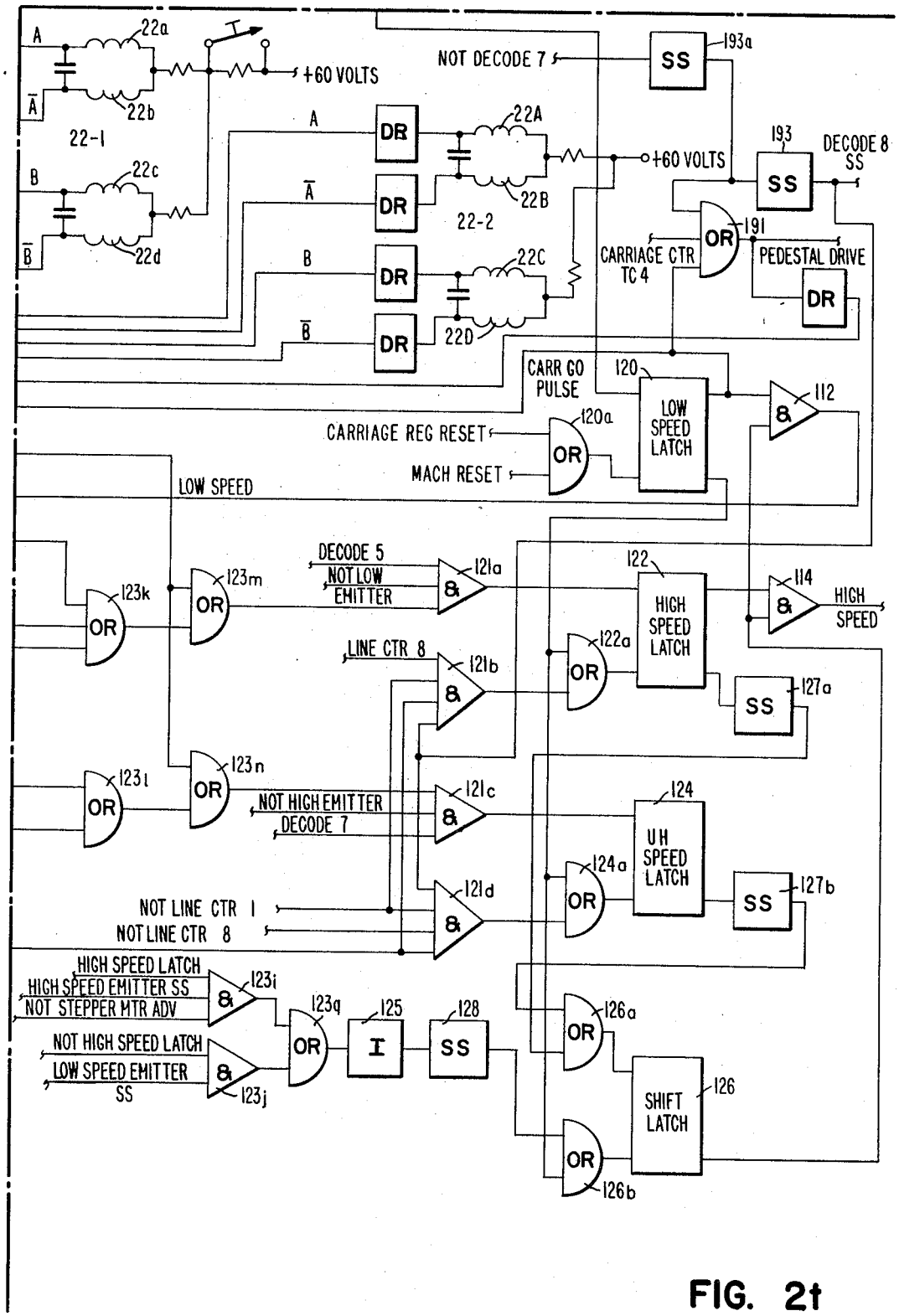
Figure 2U:
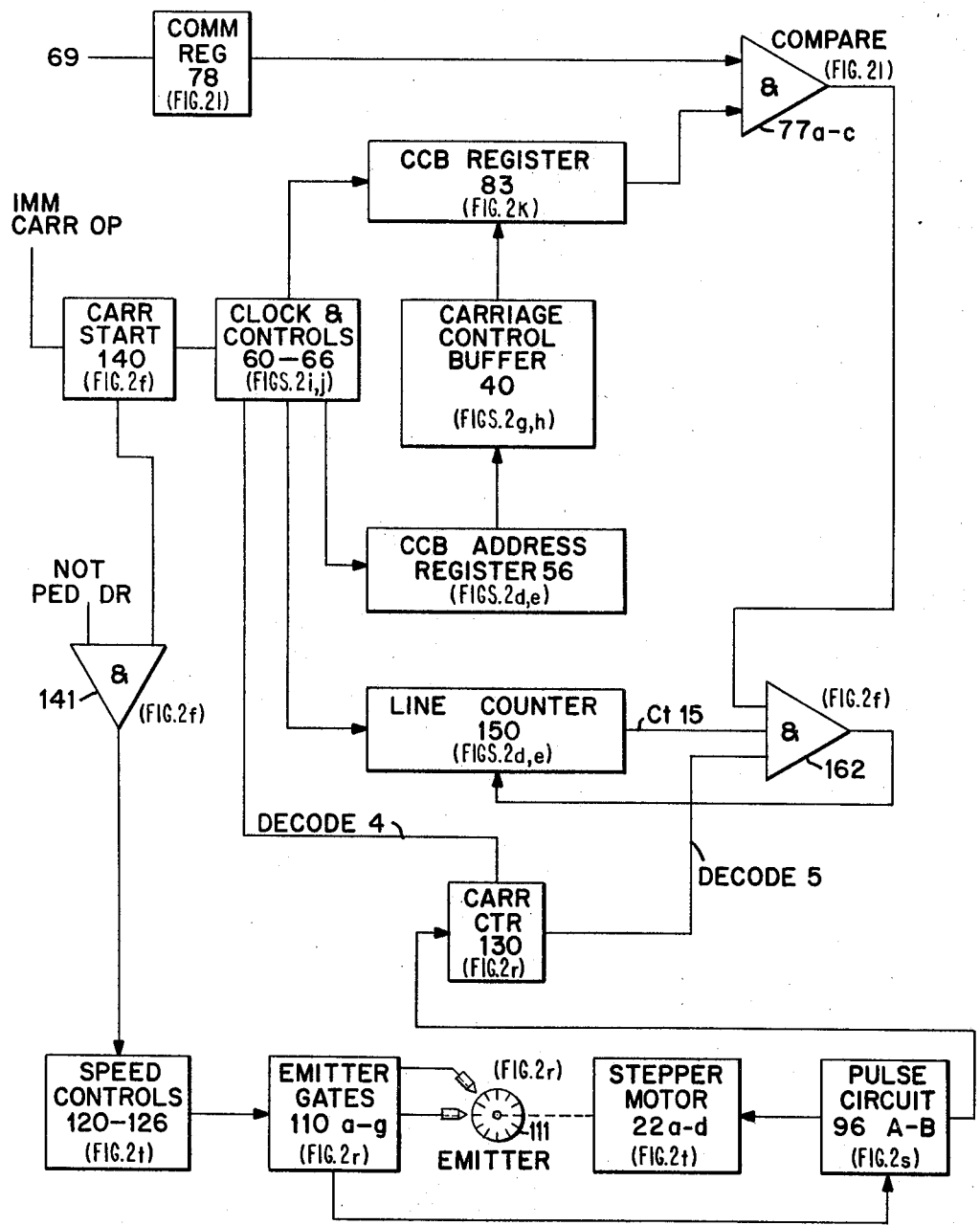

Assuming a carriage command is entered into the Command Register 78 (FIG. 2l) by a Gate Command Register signal from AND 65B [one of a group of ANDs 65A–C (FIG. 2b) providing signal inputs to different ones of the Command Latches 75a–d (FIG. 2c)] to space one line, then the Skip latch 78e of the Carriage Command register 78 will be off, so that the 4 and 8 triggers 150-4 and 150-8 of the line counter 150 will be set (FIGS. 2d–e) by the Not Skip signal from AND 149. The Not 2 bit of the Single Space command sets the 2 trigger 150-2 of the counter 150 through AND 147. Accordingly, line triggers 150-2, 150-4 and 150-8 will be set and a single space condition has been decoded from the Carriage Command register 78. The Line Counter 150 registers a count of 14 so the Single Space latch 91 (FIG. 2l) is set through decode AND 145a and OR 143. Decode AND 145b provides for operating the latch 91 when a command to skip one line is received, as distinguished from a single space command. Carriage motion starts as follows: The Carriage Go signal from AND 141 (FIG. 2f) sets the Low Speed latch 120 (FIG. 2t) giving the carriage an Initial Advance pulse from single shot 102 (FIG. 2s) and starting motion by advancing the motor drive triggers 96A and 96B, which switch current in the motor drive windings 22A–22D and 22a–22d in a well-known manner. Inverter 141a provides a Not Carriage Go signal. Additional advance pulses occur from the motor emitter 111 through AND 98 and OR 100 so that the Carriage Counter 130 (FIG. 2r) is advanced by the Stepper Motor Advance signal and its contents are decoded by the decode circuits 132 (FIG. 2n). For a pitch of 6 lines per inch, 8 pulses total are required for a single space advance, and for 8 lines per inch, 6 pulses are required. At Decode 4 time the CCB Address Counter Gate trigger 136 (FIG. 2f) is set, causing set of the Buffer Control latch 80 through AND 79 and OR 81, and starting the clock 60 (FIG. 2i) by raising Carriage Clock Start at AND 180 (FIG. 2f) and applying a signal to Clock Run trigger 62 through OR 70 and AND 68 (FIG. 2i). Reset of CCB Address Counter Gate trigger 136 (FIG. 2f) is effected at W1 time, being gated in AND 136a by Buffer Control and the CCB Address Counter Gate trigger 136 ON output. AND 136b insures the proper timing relative to settling of the carriage. The fall of CCB Address Counter Gate trigger 136 causes the OFF output to gate reset of Buffer Control latch 80 at RO in AND 196. The clock 60 takes one cycle stopping in RO. In doing so, the contents of the CCB byte 2 are read out to the CCB register 83 and the CCB Address Register 56 (FIG. 2d–e) advances to position 3 at RO time. The Line Counter 150 was advanced to count 15 at the fall of R1 time. Line Count 15 and W2 signals reset the Carriage Start latch 140 (FIG. 2f) through OR 131, AND 137, and OR 115.

When the Carriage Counter 130 (FIG. 2r) advances to Decode 5, a Stop pulse is generated at OR 160 through AND 162 (FIG. 2f). ANDs 160a and 160b provide other inputs to OR 160. This turns on the Carriage Register Reset signal at single shot 161 which resets the Line Counter 150, through OR 182 (FIG. 2d) and the Carriage Command register 78 through OR 85f (FIG. 2l). It also turns on the Device End Gate latch 164c through OR 183 (FIG. 2p) causing the Device End latch 164d to turn on through AND 185 and OR 186, producing the Device End signal in the channel status byte. This indicates to the channel that the carriage operation is ended.

The Line Counter Reset signal from the line counter 150 (FIG. 2d–e) also initiates the actual carriage stopping sequence by resetting the Low Speed latch 120 (FIG. 2t) which starts a single shot string of 3 stop pulses through AND 110b, stop circuit 134 (FIG. 2n) assuming 8 lines per inch pitch), OR 100, and AND 98 (FIG. 2s) and gates out or inhibits the feedback pulses from the motor emitters 103-4-6 (FIG. 2r).

The Carriage Counter 130 (FIG. 2r) advances six pulses per line when printing at 8 lines per inch and eight pulses per line when printing at 6 lines per inch. The particular pitch is determined by a line pitch latch 188 through switch 190 and ANDs 191a–b (FIG. 2r). The triggers 130a through 130c are gated to bring up the Decode 4 signal four pulses from the end of the line space, Decode 5 signal 3 pulses from the end of a line space, and the Decode 7 signal one pulse from the end of a line space. The counter 130 is reset on the eighth or last pulse by Decode 8.

For a double or triple space, the same Carriage Start, Line Counter 150 control and CCB Address Register 56 timing applies for the first line space. But for additional line spaces, the clock 60 is started by each Decode 4 signal which sets the CCB Address Counter Gate trigger 136 (FIG. 2f) starting the clock 60 for one cycle. Each clock cycle advances the Line Counter 150 (FIGS. 2d–e). When the Line Counter contents is 15, Line Count 15 rises at AND 151 (FIG. 2e) and brings up the Stop pulse at AND 162 (FIG. 2f) at Decode 5 time, starting the stop sequence which stops the carriage mechanism. Carriage Register Reset from the single shot 161 (FIG. 2f) starts the carriage operation ending sequence as previously described. Note that the Line Counter 150 (FIGS. 2d–e) is initialized to a count of 13 through ANDs 116 and 149 for a double space, and to a count of 12 through AND 149 alone for a triple space at the start of the space command.

Description of a low speed skip operation is as follows: A Skip Immediate or Skip After Write command will be entered in the Carriage Command register 78 (FIG. 2l) and the bus out bit 0 will turn on the Skip Latch 78e in the register 78. The Carriage Start latch 140 (FIG. 2f) will be turned on by Immediate Carriage Go or Carriage Go After Print from AND 142 or AND 146 through OR 144. The CCB Address Counter Gate trigger 136 is set by the Carriage Start signal through AND 192 and OR 194 and brings up Carriage Clock Start at AND 180. The Buffer Control latch 80 will be set by the OR output of the CCB Address Counter Gate trigger 136, gating the advance of the CCB Address Register 56 at RO time (FIGS. 2d–e). The clock 60 will advance the CCB Address Register 56 and the Line Counter 150. The carriage mechanism has been activated by the Carriage Go signal generated by the Carriage Start latch 140 and AND 141 (FIG. 2f).

The Carriage Start latch 140 is not reset, so the return of the clock 60 to RO again sets the CCB Address Counter Gate trigger 136 through AND 192 and OR 194 (FIG. 2f) permitting the clock 60 to run an additional cycle. The Line Counter 150 and the CCB Address Register 56 (FIGS. 2d–e) advance, and the contents of the addressed bit location in the Carriage Control Buffer 40 is read out to the Carriage Register 83 each clock cycle.

Assume that the skip channel digit stored in the bits 1, 2, 4, and 8 of the Carriage Command Register 78 is stored in byte 5 of the Carriage Control Buffer 40, and assume also that the forms were located at line 1 when the carriage skip was started. As shown in the timing diagram of FIG. 7, a Carriage Register Compare signal will occur at AND 77c (FIG. 2l) when the contents of CCB position 5 is read into the CCB register 83 (Inverter 77d provides a Not Carriage Register Compare signal. This will set the Carriage Compare latch 159 through OR 113a, AND 113 and OR 117 (FIG. 2f). AND 113b provides another input to OR 117. Further advance of the CCB Address Register 56 is inhibited after RO of the current clock cycle because CCB Address Counter Gate trigger 136 is reset through AND 67 and OR 95. The CCB Address Register 56 will have advanced four times. Carriage Compare from the latch 159 resets CCB Address Counter Gate trigger 136 and the Carriage Start latch 140. The Line Counter 150 is complemented by the Carriage Compare signal over conductor 195 (FIG. 2d) (gated by an input on line 197 through OR 154c from AND 154b, one of two inputs from ANDs 154a–154b) so that its contents are changed from a count of 4 to a count of 11. The clock 60 completes the present cycle and stops in RO. The Carriage Go signal from the Carriage Start latch 140 (FIG. 2f) started the carriage by setting the Low Speed latch 120 (FIG. 2t). Carriage Compare Latch 159 is reset by AND 117a.

Only 8 microseconds will have elapsed, so the first Decode 4 signal from the Carriage Counter 130 (FIG. 2r) will not have yet been generated. The first Decode 4 signal sets the CCB Address Counter Gate trigger 136 (FIG. 2f) causing the clock 60 (FIG. 2i) to take one cycle. The three following Decode 4 signals produced by carriage emitter signals from AND 98 (FIG. 2s) do likewise. The Line Counter 150 contents is now 15, bringing up Line Count 15 at AND 151 (FIG. 2e), which brings up the Stop pulse at AND 162 (FIG. 2f). Carriage Register Reset signal from OR 160 and single shot 161 (FIG. 2f) resets the Command Register 78 (FIG. 2l) and the Line Counter 150 (FIGS. 2d and e), and initiates the carriage stopping sequence by resetting the Low Speed latch 120. Reset of the Low Speed latch 120 (FIG. 2t) causes the mechanism to stop as previously described. The carriage has advanced four lines from 1 to 5. Carriage Control Buffer 40 has advanced from position 2 to position 6.

Assume that the command is loaded to skip to a forms channel 15 line spaces or more from the present print line. Specifically assume that the channel digit is stored in position 20 of the Carriage Control Buffer 40 and line 1 was the last line printed. In this case, a Carriage Compare signal from the Carriage Compare latch 159 (FIG. 2f) will not occur during 15 initial advances of the Line Counter 150 (FIGS. 2d–e). When the Line Counter 150 reaches a count of 15, inverter 153 (FIG. 2e) inhibits further advance of the Line Counter 150. In each of the 15 clock pulses the CCB Address Register 56 was advanced, so that the CCB Address is 16 line spaces ahead of the actual forms line. The first and successive Decode 4 pulses from decode circuit 132a (FIG. 2r) will force additional stepping of the CCB Address Register 56 (FIGS. 2d–e) until a Carriage Register Compare occurs at AND 77c (FIG. 2l), at CCB address 20, turning on Carriage Compare latch 159 at W0 time through AND 113 and OR 117 (FIG. 2f). Further advance of the CCB Address Register 56 (FIGS. 2d–e) is inhibited when Buffer Control latch 80 (FIG. 2f) is gated down after reset of CCB Address Counter Gate trigger 136 at W1 time after compare by RO through AND 196. Since the Buffer Control signal is a D-C level signal applied to the D-C gates 56b and 56c of the CCB1 trigger 56–1, RO, which is a pulse signal applied to the A-C inputs 56d and 56e of the trigger 56–1, will also advance the CCB Address Register 56 to 21 even though RO resets Buffer Control latch 80. The Line Counter 150 is complemented to zero by the Carriage Compare signal, and carriage advance continues. Each Decode 4 signal causes the advance of the Line Counter 150 as previously described, since line count 15 came down when the Line Counter 150 was complemented. Fifteen line spaces after Carriage Compare occurred, Line Count 15 signal rises at AND 151 (FIG. 2e) generating the Stop pulse at AND 162 (FIG. 2f). The same stopping procedure will occur as described previously and the form will stop in position 20 with the CCB Address Register 56 containing address 21.

When the Line Counter 150 initially advances to 15 without a compare at AND 77c (FIG. 2l), High and Ultra High Speed conditions were generated through AND 123a (FIG. 2s), ORs 123m and 123n (FIG. 2t) and ANDs 121a and 121c which sets the High Speed latch 122 (FIG. 2t) and the Ultra High Speed Latch 124 at Decode 5 and Decode 7, respectively. Thus, for a few microseconds, carriage advance was called for in Low Speed and was then changed to a High Speed and finally an Ultra High Speed mode by operation of these latches, 122, 124. Of course, no carriage motion actually occurred during this short time. The Ultra and High Speed modes are removed a predetermined number of lines, for example, at line counts of 13 and 11, and 5 and 3, for spacings of 8 and 6 lines per inch, respectively, before the stopping point by the reset of the Ultra and High Speed latches 124 and 122 through ANDs 121d and 121b and ORs 124a and 122a in response to line counts through AND 123g or AND 123h, and OR 123p (FIG. 2s), respectively. Thus, it will be seen that a high speed skip will occur if the channel skip is to a location 15 or more line spaces away. The specific skip range depends on the carriage drive velocity time characteristic. Likewise, control of the deceleration by decode of the displacement in line increments to the stopping point, using the Line Counter contents, can be used in other types of carriage mechanisms by using different decode values.

During a space or skip operation, the printer may come to the end of a form. When the printer is at the next to last line of a form, but the carriage emitter pulse indicating that the forms are moving to the last line has not occurred, the Carriage Address Register 56 contains the address of the last line of the form and the Carriage Control Buffer Register 83 will contain the byte associated with the next to last line of the form. When the Decode 4 pulse is received for the last line of the form, the Carriage Control Buffer Register 83 will be loaded with a byte containing the flag bit indicating the end of the document. Detection of the flag bit resets the CCB Address Register 56 (FIGS. 2d–e) through AND 175 and OR 174. This is a D-C reset and occurs at R0, overriding the CCB address register advance which normally occurs at R0. When the clock 60 stops at R0, the CCB address is 1, the carriage register contains a flag bit and the form is at the last line and is moving. ANDs 57a, 57b (FIG. 2e) decode Address 0 for providing a CCB Address 0 or Flag Signal at OR 58, and CCB Address 1, respectively.

A Carriage Run Away latch 200 (FIG. 2d) is provided which is set through AND 202, reset through OR 201 by Carriage Go or by an input from OR 172, and provides a Run Away signal at AND 203 (FIG. 2l) if CCB address 1 occurs with the Carriage Run Away latch 200 set. Inverter 205 provides a Not Carriage Runaway signal. This senses that two channel ones occurred during the same forms command so that a complete form has passed by the print line without stopping the mechanism. The parity check circuit 89 (FIG. 2k) is checked for parity every W0 time on an Odd bit basis through AND 204 and OR 204a (FIG. 2l). Normally, a carriage emitter signal should occur for every line space although the emitter pulse which occurs during stopping is not functionally necessary. The Carriage Command Register 78 may have been inadvertently loaded with a forms channel digit which was not in fact loaded into the carriage control buffer 40. This is a programming error. When the carriage is set in motion, controls will look for this valid channel in the buffer 40 but none will be found. If a complete form passes by the print line as sensed by the existence of two carriage address 1 conditions in the same command, a channel code did not exist and a Carriage Run Away condition is occurring.

From the above description and the accompanying drawing, it will be apparent that the present invention eliminates the requirement for the operator to prepare and install a paper control tape. Troubles caused by wear and tear of paper control tapes are thereby eliminated. The maintenance problems connected with the paper tape sensing brushes are also eliminated. A tapeless carriage control system embodying the features of the present invention is program compatible with existing control systems. Programs may be readily changed by simply loading a new one into the carriage control buffer 40.

What is claimed is:

1. In a control system for a printer carriage having a drive means 22 operated by pulses from a pulse circuit 96 to actuate said carriage to advance a document on which a printing operation is to be performed different predetermined line amounts in accordance with incoming skip channel command signals.

addressable carriage control magnetic core storage means 40 having a plurality of line positions corresponding to print lines of said document storing coded representations of carriage skip channel designation command signals at selected line positions to effect stopping of said carriage at the corresponding document line, a command register 78 storing a single skip channel designation command signal at a time, a carriage control buffer register 83 connected to said carriage control storage means 40 storing a single representation of a carriage skip channel designation command signal at a time from said carriage control storage means 40, address register means 56 connected to the carriage control storage means 40 for addressing said carriage control storage means 40 a line position at a time and reading the stored representation into said carriage control buffer register 83 in sequence, compare means 77c connected to said command register 78 and said carriage control buffer register 83 to produce a compare signal in response to identical channel designation command signals representations in said registers, a line counter 150, clock means 60 connected to said address register means 56 and to said line counter 150 to address said carriage control storage means 40 and advance said line counter 150, means 159 connected to said compare means 77c and said line counter 150 to complement said line counter upon the occurrence of said compare signal and to said address register means 56 to inhibit further advance of said address register means, emitter means 111 driven with said carriage connected to said pulse circuit 96 to activate said pulse circuit 96 and said clock means 60, and gate means 162 responsive to a predetermined count of said line counter 150 connected to said line counter 150 and said pulse circuit 96 to produce a stop pulse for operating said pulse circuit 96 to stop said drive means 22.

2. The invention as defined in claim 1 characterized by a single shot being connected to the pulse circuit to activate the pulse circuit by producing a first timed advance pulse for initiating a line space operation of the drive means.

3. The invention as defined in claim 1 characterized by said clock means 60 being of a single cycle at a time type which is connected to an OR circuit 70 to be turned on either in response to particular tag line signals when loading said addressable carriage control magnetic core storage means 40 or in response to operation of a carriage start latch 140 which is connected to initiate the first timed pulse to start said clock means 60 when effecting control of said carriage.

4. The invention as defined in claim 3 characterized by the compare means being connected to the line counter to complement the line counter from the count at which a compare occurs between the contents of the command register and the carriage control register.

5. The invention as defined in claim 4 characterized by a carriage counter which counts individual steps of the drive means and is connected to AND gate means to control jointly with the line counter the production of the stop pulse.

6. The invention as defined in claim 3 characterized by circuit means 123a connecting said line counter 150 and said compare means 77c to produce a signal in response to a predetermined line count before said compare signal to effect operation of said pulse circuit 96 to operate said drive means 22 at a higher speed.

7. The invention as defined in claim 6 characterized by the line counter being connected to AND gate means to effect slow speed operation of the pulse circuit a preselected number of lines before the predetermined count effects the stop pulse.

References Cited

UNITED STATES PATENTS

| | | | |
|---|---|---|---|
| 2,944,651 | 7/1960 | Malcolm et al. | 197—133 |
| 3,094,261 | 6/1963 | Thompson | 197—133 X |
| 3,123,195 | 3/1964 | Hewitt et al. | 197—133 |
| 3,171,349 | 3/1965 | Kodis et al. | 101—93 |
| 3,192,854 | 7/1965 | Martin | 101—93 |
| 3,292,530 | 12/1966 | Martin | 101—93 |
| 3,312,174 | 4/1967 | Cunningham | 197—133 X |
| 3,343,131 | 9/1967 | Bloom et al. | 101—93 X |
| 3,354,816 | 11/1967 | Giannuzzi | 101—93 |

ERNEST T. WRIGHT, Jr., Primary Examiner